(12) United States Patent
Lawson et al.

(10) Patent No.: US 12,111,253 B2
(45) Date of Patent: Oct. 8, 2024

(54) METHOD AND APPARATUS FOR DETERMINING A REFLECTANCE OF A TARGET OBJECT

(71) Applicant: UNIVERSITY OF ESSEX ENTERPRISES LIMITED, Essex (GB)

(72) Inventors: Tracy Lawson, Essex (GB); John Stamford, Essex (GB)

(73) Assignee: UNIVERSITY OF ESSEX ENTERPRISES LIMITED (GB)

( * ) Notice: Subject to any disclaimer, the term of this patent is extended or adjusted under 35 U.S.C. 154(b) by 209 days.

(21) Appl. No.: 17/781,759

(22) PCT Filed: Nov. 27, 2020

(86) PCT No.: PCT/GB2020/053032
§ 371 (c)(1),
(2) Date: Jun. 2, 2022

(87) PCT Pub. No.: WO2021/111112
PCT Pub. Date: Jun. 10, 2021

(65) Prior Publication Data
US 2023/0028946 A1      Jan. 26, 2023

(30) Foreign Application Priority Data
Dec. 2, 2019   (GB) ..................... 1917600

(51) Int. Cl.
*G01N 21/359*   (2014.01)
*G01N 21/17*   (2006.01)
(Continued)

(52) U.S. Cl.
CPC ........... *G01N 21/359* (2013.01); *G01N 21/55* (2013.01); *G01N 21/84* (2013.01); *H04N 23/11* (2023.01);
(Continued)

(58) Field of Classification Search
CPC ...... G01N 21/359; G01N 21/55; G01N 21/84; G01N 2021/1765; G01N 2021/558;
(Continued)

(56) References Cited

U.S. PATENT DOCUMENTS

| 2005/0206907 A1* | 9/2005 | Fujimoto ........... G01B 11/0625 356/504 |
| 2015/0130936 A1 | 5/2015 | Coram et al. |

(Continued)

FOREIGN PATENT DOCUMENTS

| WO | WO 2018/022864 | 2/2018 |
| WO | WO 2018/136175 | 7/2018 |

OTHER PUBLICATIONS

"Plant Phenotyping Market worth $268.1 million by 2023," MarketsandMarkets Research Private Ltd., 2019, 5 pages [retrieved online Feb. 18, 2019 from: www.marketsandmarkets.com/PressReleases/plant-phenotyping.asp].

(Continued)

*Primary Examiner* — Md M Rahman
(74) *Attorney, Agent, or Firm* — SHERIDAN ROSS PC

(57) ABSTRACT

A method and apparatus for determining a reflectance, of at least a portion of a target object, in at least one selected wavelength range of electromagnetic (EM) radiation are disclosed. The method comprises, for each selected wavelength range, providing a digital image including at least one target object and a plurality of reference objects, each reference object having respective non-identical predetermined reflectance characteristics, with a digital camera arrangement that provides output image data that comprises digital numbers that are responsive to radiation, in only a selected wavelength range, incident at a sensing plane of the digital camera arrangement. A relationship between a first set of the digital numbers is determined and a first set of the respective predetermined reflectance characteristics of the (Continued)

reference objects. Responsive to the relationship, a further set of digital numbers is transformed to allocate a value of reflectance for each of the digital numbers in the further set. For at least a portion of the target object, a corresponding first group of allocated values of reflectance is determined and responsive to the first group of allocated values, determining a reflectance of the portion of the target object.

18 Claims, 17 Drawing Sheets

(51) Int. Cl.
*G01N 21/55* (2014.01)
*G01N 21/84* (2006.01)
*H04N 23/11* (2023.01)

(52) U.S. Cl.
CPC ............ *G01N 2021/1765* (2013.01); *G01N 2021/558* (2013.01); *G01N 2021/8466* (2013.01)

(58) Field of Classification Search
CPC ......... G01N 2021/8466; G01N 21/274; G01N 2021/1797; G01N 2201/0214; G01N 2201/0216; G01N 21/31; G01N 2201/0221; H04N 23/11; G06V 20/188; G06Q 50/02
USPC .......................................................... 356/51
See application file for complete search history.

(56) References Cited

U.S. PATENT DOCUMENTS

| | | | | |
|---|---|---|---|---|
| 2018/0174357 | A1* | 6/2018 | Priest | G06T 15/205 |
| 2018/0180533 | A1 | 6/2018 | Murakami et al. | |
| 2018/0350043 | A1* | 12/2018 | Seely | H04N 23/62 |
| 2019/0222756 | A1* | 7/2019 | Moloney | G06V 10/82 |
| 2019/0285541 | A1 | 9/2019 | Takashima | |

OTHER PUBLICATIONS

Herrick "Discover NDVI and Its Valuable Uses in Agriculture," Botlink, Aug. 17, 2017, 8 pages [retrieved online from: botlink.com/blog/discover-ndvi-and-its-valuable-uses-in-agriculture].

Gpolder "[Pi IoT] Plant Health Camera #1—Application | element14 | Pi Iot" element14.com, May 24, 2016, 6 pages [retrieved online from: www.element14.com/community/community/design-challenges/pi-iot/blog/2016/05/24/smart-camera-for-measuring-plant-health].

Shaw et al. "Multispectral imaging systems on tethered balloons for optical remote sensing education and research," Journal of Applied Remote Sensing, 2012, vol. 6, No. 1, Article 063613, 12 pages.

Search Report for United Kingdom Patent Application No. GB1917600.7, dated May 21, 2020, 1 page.

International Search Report and Written Opinion for International (PCT) Patent Application No. PCT/GB2020/053032, dated Mar. 11, 2021, 13 pages.

Anderson et al. "Using Ordinary Digital Cameras in Place of Near-Infrared Sensors to Derive Vegetation Indices for Phenology Studies of High Arctic Vegetation," Remote Sensing, 2016, vol. 8, article 847, 17 pages.

Baugh et al. "Empirical proof of the empirical line," International Journal of Remote Sensing, Feb. 2008, vol. 29, No. 3, pp. 665-672.

Bannari et al. "A review of vegetation indices," Remote Sensing Reviews, vol. 13, No. 1, pp. 95-120.

Valle et al. "PYM: a new, affordable, image-based method using a Raspberry Pi to phenotype plant leaf area in a wide diversity of environments," Plant Methods, 2017, vol. 13, article 98, 17 pages.

Clevers et al. "Remote estimation of crop and grass chlorophyll and nitrogen content using red-edge bands on Sentinel-2 and -3," International Journal of Applied Earth Observation and Geoinformation, 2013, vol. 23, pp. 344-351.

Das et al. "Ultra-portable, wireless smartphone spectrometer for rapid, non-destructive testing of fruit ripeness," Scientific Reports, Sep. 2016, vol. 6, article 32504, 8 pages.

Deglint et al. "A Compact Field-portable Computational Multispectral Microscope using Integrated Raspberry Pi," Journal of Computational Vision and Imaging Systems, 2016, vol. 2, No. 1, 3 pages.

Drusch et al. "Sentinel-2: ESA's Optical High-Resolution Mission for GMES Operational Services," Remote Sensing of Environment, 2012, vol. 120, pp. 25-36.

Dworak et al. "Strategy for the Development of a Smart NDVI Camera System for Outdoor Plant Detection and Agricultural Embedded Systems," Sensors, 2013, vol. 13, pp. 1523-1538.

Eitel et al. "Active Ground Optical Remote Sensing for Improved Monitoring of Seedling Stress in Nurseries," Sensors, 2010, vol. 10, pp. 2843-2850.

Ferrier "Evaluation of apparent surface reflectance estimation methodologies," International Journal of Remote Sensing, 1995, vol. 16, No. 12, pp. 2291-2297.

Furbank et al. "Phenomics—technologies to relieve the phenotyping bottleneck," Trends in Plant Science, Dec. 2011, vol. 16, No. 12, pp. 635-644.

Grant et al. "Exploring thermal imaging variables for the detection of stress responses in grapevine under different irrigation regimes," Journal of Experimental Botany, 2007, vol. 58, No. 4, pp. 815-825.

Grant et al. "Thermal imaging to detect spatial and temporal variation in the water status of grapevine (*Vitis vinifera* L.)," The Journal of Horticultural Science and Biotechnology, 2016, vol. 91, No. 1, pp. 43-54.

Gu et al. "NDVI saturation adjustment: A new approach for improving cropland performance estimates in the Greater Platte River Basin, USA," Ecological Indicators, 2013, vol. 30, pp. 1-6.

Guilioni et al. "On the relationships between stomatal resistance and leaf temperatures in thermography," Agricultural and Forest Meteorology, 2008, vol. 148, pp. 1908-1912.

Hoagland et al. "The Water-Culture Method for Growing Plants without Soil," The College of Agriculture, University of California, Berkeley, 1950, Circular 347, 32 pages.

Jacquemoud et al. "Prospect+Sail models: A review of use for vegetation characterization," Remote Sensing of Environment, 2009, vol. 113, pp. S56-S66.

Jones et al. "Thermal infrared imaging of crop canopies for the remote diagnosis and quantification of plant responses to water stress in the field," Functional Plant Biology, 2009, vol. 36, pp. 978-989.

Kaizu et al. "A dual-spectral camera system for paddy rice seedling row detection," Computers and Electronics in Agriculture, 2008, vol. 63, pp. 49-56.

Kuhlgert et al. "MultispeQ Beta: a tool for large-scale plant phenotyping connected to the open PhotosynQ network," Royal Society Open Science, 2016, vol. 3, article 160592, 17 pages.

Lebourgeois et al. "Can Commercial Digital Cameras be Used as Multispectral Sensors? A Crop Monitoring Test," Sensors, 2008, vol. 8, pp. 7300-7322.

Leinonen et al. "Estimating stomatal conductance with thermal imagery," Plant, Cell and Environment, 2006, vol. 29, pp. 1508-1518.

Li et al. "Advances in Non-Destructive Early Assessment of Fruit Ripeness towards Defining Optimal Time of Harvest and Yield Prediction—A Review," Plants, 2018, vol. 7, article 3, 20 pages.

Lowe "Distinctive Image Features from Scale-Invariant Keypoints," International Journal of Computer Vision, 2004, vol. 60, No. 2, pp. 91-110.

Maes et al. A new wet reference target method for continuous infraredthermography of vegetations, Agricultural and Forest Meteorology, 2016, vol. 226-227, pp. 119-131.

Magney et al. "Proximal NDVI derived phenology improves in-season predictionsof wheat quantity and quality," Agricultural and Forest Meteorology, 2016, vol. 217, pp. 46-60.

(56) References Cited

OTHER PUBLICATIONS

Minervini et al. "Image Analysis: The New Bottleneck in Plant Phenotyping," IEEE Signal Processing Magazine, Jul. 2015, vol. 32, No. 4, pp. 126-131.
Moller et al. "Use of thermal and visible imagery for estimating crop water status of irrigated grapevine," Journal of Experimental Botany, 2007, vol. 58, No. 4, pp. 827-838.
Moran et al. "A refined empirical line approach for reflectance factor retrieval from Landsat-5 TM and Landsat-7 ETM+," Remote Sensing of Environment, 2001, vol. 78, pp. 71-82.
Pagnutti et al. "Laying the foundation to use Raspberry Pi 3 V2 camera module imagery for scientific and engineering purposes," Journal of Electronic Imaging, Jan./Feb. 2017, vol. 26, No. 1, article 013014, 14 pages.
Peddle et al. "Reflectance processing of remote sensing spectroradiometer data," Computers & Geosciences, 2001, vol. 27, pp. 203-213.
Petach et al. "Monitoring vegetation phenology using an infrared-enabled security camera," Agricultural and Forest Meteorology, 2014, vol. 195-196, pp. 143-151.
Rahaman et al. "Advanced phenotyping and phenotype data analysis for the study of plant growth and development," Frontiers in Plant Science, Aug. 2015, vol. 6, article 619, 15 pages.
Richardson et al. Use of digital webcam images to track spring green-up in a deciduous broadleaf forest, Oecologia, 2007, vol. 152, pp. 323-334.
Ritchie et al. "Preparation of a Low-Cost Digital Camera System for Remote Sensing," Applied Engineering in Agriculture, 2008, vol. 24, No. 6, pp. 885-896.
Rouse, Jr. et al. "Monitoring the Vernal Advancement and Retrogradation (Green Wave Effect) of Natural Vegetation," Texas A&M University Remote Sensing Center, Apr. 1973, Progeress Report RSC Jan. 1978, 120 pages.
Ryu et al. "Monitoring multi-layer canopy spring phenology of temperate deciduous and evergreen forests using low-cost spectral sensors," Remote Sensing of Environment, 2014, vol. 149, pp. 227-238.
Sakamoto et al. "An alternative method using digital cameras for continuous monitoring of crop status," Agricultural and Forest Meteorology, 2012, vol. 154-155, pp. 113-126.
Schindelin et al. "Fiji: an open-source platform for biological-image analysis," Nature Methods, Jul. 2012, vol. 9, No. 7, pp. 676-682.
Shibayama et al. "Continuous Monitoring of Visible and Near-Infrared Band Reflectance from a Rice Paddy for Determining Nitrogen Uptake Using Digital Cameras," Plant Production Science, 2009, vol. 12, No. 3, pp. 293-306.
Sims et al. "Relationships between leaf pigment content and spectral reflectance across a wide range of species, leaf structures and developmental stages," Remote Sensing of Environment, 2002, vol. 81, pp. 337-354.
Smith et al. "The use of the empirical line method to calibrate remotely sensed data to reflectance," International Journal of Remote Sensing, 1999, vol. 20, No. 13, pp. 2653-2662.
Suarez et al. "Assessing canopy PRI for water stress detection with diurnal airborne imagery," Remote Sensing of Environment, 2008, vol. 112, pp. 560-575.
Thenkabail et al. "Evaluation of Narrowband and Broadband Vegetation Indices for Determining Optimal Hyperspectral Wavebands for Agricultural Crop Characterization," Photogrammetric Engineering & Remote Sensing, Jun. 2002, vol. 68, No. 6, pp. 607-621.
Tovar "Raspberry Pi-powered imaging for plant phenotyping," Applications in Plant Sciences, 2018, vol. 6, No. 3, article e1031, 12 pages.
Xue et al. "Significant Remote Sensing Vegetation Indices: A Review of Developments and Applications," Journal of Sensors, 2017, vol. 2017, Article ID 1353691, 17 pages.

\* cited by examiner

METHOD AND APPARATUS FOR DETERMINING A REFLECTANCE OF A TARGET OBJECT

CROSS REFERENCE TO RELATED APPLICATIONS

This application is a national stage application under 35 U.S.C. 371 and claims the benefit of PCT Application No. PCT/GB2020/053032 having an international filing date of 27 Nov. 2020, which designated the United States, which PCT application claimed the benefit of Great Britain Patent Application No. 1917600.7 filed 2 Dec. 2019, the disclosures of each of which are incorporated herein by reference in their entireties.

The present invention relates to the measurement of the reflectance of objects. In particular, but not exclusively, the present invention relates to the measurement of the reflectance, of a portion or portions of a chosen object, in a plurality of wavelength ranges of electromagnetic (EM) radiation selected by a user and the subsequent determination of a respective index of reflectance. For example, determining a 'Normalised Difference Vegetation Index' (NDVI) of agricultural land, a field, a forest, a garden, or plants or leaves thereof.

The reflectance of an object is the proportion (often stated as a percentage) of incident radiation that is reflected by the object.

It is often useful to measure the reflectance of plants, vegetation, or a large area containing plants or vegetation, within selected wavelength ranges of EM radiation. This is because, broadly speaking, healthy plants absorb light within the 400-500 nm and 600-700 nm ranges as a source of energy for photosynthesis. Generally, light within the 500-600 nm range is reflected by a healthy plant. This absorption of, for example, blue, near-blue, red, and near-red light in combination with the reflection of, for example, green and near-green light explains why a plant with foliage of a vibrant green colour would be considered 'healthy', at least upon a prima facie visual inspection.

The 'spongy' cell layer on the surface of a healthy leaf strongly reflects near-infrared light (NIR), which is electromagnetic radiation invisible to the naked-eye characterised by having a wavelength within the portion of the infrared region closest to red light. A stressed or unhealthy plant will experience a change in structure of this cell layer, resulting in lesser NIR reflectance, and will experience degradation of its chlorophyll, resulting in greater red light reflectance.

Thus, a 'Normalised Difference Vegetation Index' (NDVI) provides a simple, clear way of assessing the health of plants or the quantity of vegetation in an area. An NDVI is determined from the reflectance measurements of red and near-infrared light of the target object(s). As an NDVI is determined from the reflectance properties of an object, it is an example of an index of reflectance. Other indexes of reflectance exist, such as the Photochemical Reflectance Index (PRI) which can be used to assess photosynthetic efficiency and plant stress.

For some plants, the reflectance properties when stressed or unhealthy change in the NIR range of electromagnetic radiation before the visible range, thus observational techniques of monitoring plant health that include measuring the NIR reflectance of a plant (such as monitoring an NDVI of the plant) may allow for an interested party (e.g. a farmer, gardener, academic, analyst, and the like) to be aware of changes in plant health up to two or three weeks before a visual inspection with the naked-eye would indicate any such change.

Methods and systems for measuring the reflectance of an object within a selected wavelength range, and subsequently determining an NDVI (or other index of reflectance) of the object, have been of increasing commercial, expert, and amateur interest: farmers and gardeners, for example, have found such methods and systems useful to monitor the health of their crops and plants. Such a system is especially useful if it can be easily affixed or integrated into a handheld device, agricultural equipment, or aerial vehicles (manned or unmanned). Ecologists, geographers, environmental scientists, and other experts also have interests in determining an NDVI of vegetation, for example to monitor changes in the environment.

Conventionally, such methods and systems to measure reflectance and calculate an NDVI use expensive and proprietary components. An unfortunate consequence of this, amongst other reasons, is that currently available systems are cost-prohibitive, difficult to customise, and cannot easily be scaled to an individual need. Consequently, many who might benefit from being able to determine a reflectance, or an NDVI or another index of reflectance, of at least a portion of an object are unable to do so.

It is an aim of the present invention to at least partly mitigate one or more of the above-mentioned problems.

It is an aim of certain embodiments of the present invention to provide a method and apparatus for determining the reflectance, of at least a portion of a target object, in a selected wavelength range and for determining at least one index of reflectance for that selected portion.

It is an aim of certain embodiments of the present invention to provide a method and apparatus for determining the reflectance, of at least a portion of a target object, in a selected wavelength range without a need for expensive or proprietary components.

It is an aim of certain embodiments of the present invention to provide a method and apparatus for determining the reflectance, of at least a portion of a target object, in a selected wavelength range using relatively cheap 'off-the-shelf' components.

It is an aim of certain embodiments of the present invention to provide a method and apparatus, that is readily customisable by a user, for determining the reflectance, of at least a portion of a target object, in a selected wavelength range.

It is an aim of certain embodiments of the present invention to provide a method and apparatus for determining at least one index of reflectance, of at least a portion of a target object, without the need for expensive or proprietary components.

It is an aim of certain embodiments of the present invention to provide a method and apparatus for determining at least one index of reflectance, of at least a portion of a target object, using relatively cheap 'off-the-shelf' components.

It is an aim of certain embodiments of the present invention to provide a method and apparatus for determining at least one index of reflectance, of at least a portion of a target object, that is readily customisable by a user.

According to a first aspect of the present invention there is a method for determining a reflectance, of at least a portion of a target object, in at least one selected wavelength range of electromagnetic (EM) radiation, comprising, for each selected wavelength range:

providing a digital image including at least one target object and a plurality of reference objects, each reference object having respective non-identical predetermined reflectance characteristics, with a digital camera arrangement that provides output image data that comprises digital numbers that are responsive to radiation, in only a selected wavelength range, incident at a sensing plane of the digital camera arrangement;

determining a relationship between a first set of the digital numbers and a first set of the respective predetermined reflectance characteristics of the reference objects;

responsive to the relationship, transforming a further set of digital numbers to allocate a value of reflectance for each of the digital numbers in the further set;

for at least a portion of the target object, determining a corresponding first group of allocated values of reflectance; and responsive to the first group of allocated values, determining a reflectance of the portion of the target object.

Aptly the method further comprises determining an index of reflectance for the portion of the target object.

Aptly the method further comprises determining the index of reflectance by the steps of:

via a first selected wavelength range, determining a corresponding first reflectance of the portion of the target object;

via at least a second selected wavelength range, determining a corresponding further reflectance of the portion of the target object; and determining the index by determining a predetermined relationship between the first and further reflectances.

Aptly the step of determining the index further comprises determining a Normalised Differenced Vegetation Index (NDVI) or determining a Photochemical Reflectance Index (PRI).

Aptly the method further comprises modifying allocated values of reflectance for each of the digital numbers in the further set, whereby values below 0% reflectance are set to 0% reflectance and values above 100% reflectance are set to 100% reflectance.

Aptly the digital image is a digital representation of a scene including the at least one target object and the plurality of reference objects.

Aptly the output image data further comprises file format overhead.

Aptly the output image data comprises gamma-encoded data.

Aptly each portion of a target object comprises at least one region of interest.

Aptly the method further comprises determining a reflectance of at least one region of interest.

Aptly a region of interest comprises an edge of the target object.

Aptly the target object is a plant, a crop, a field, a forest, a portion of agricultural land, a garden, or a leaf or set of leaves thereof.

Aptly a selected wavelength range of electromagnetic (EM) radiation is selected from a wavelength range of visible red light.

Aptly a selected wavelength range of electromagnetic (EM) radiation is selected from a wavelength range of near-infrared (NIR) light.

Aptly a selected wavelength range of electromagnetic (EM) radiation is 610 nm to 630 nm.

Aptly a selected wavelength range of electromagnetic (EM) radiation is 710 nm to 730 nm.

Aptly a mid-range wavelength of a selected wavelength range of electromagnetic (EM) radiation is between 665 nm and 675 nm and optionally is around 668 nm.

Aptly a mid-range wavelength of a selected wavelength range of electromagnetic (EM) radiation is between 710 nm and 720 nm and optionally is around 717 nm.

Aptly a predetermined reflectance characteristic of a reference object is a reflectance, for a selected wavelength range, of the reference object.

Aptly the digital camera arrangement comprises at least one digital camera.

Aptly the at least one digital camera comprises a Raspberry Pi Camera Module and optionally is a Raspberry Pi Camera Module V2.

Aptly the at least one digital camera comprises a Raspberry Pi NoIR Camera Module and optionally is a Raspberry Pi Camera Module NoIR V2.

Aptly the digital camera arrangement comprises a plurality of electromagnetic radiation filters.

Aptly at least one of the plurality of electromagnetic radiation filters comprise a blue optical filter.

Aptly at least one of the plurality of electromagnetic radiation filters comprise a near infrared (NIR) light filter.

Aptly the digital camera comprises at least one electromagnetic radiation filter of the plurality of electromagnetic radiation filters.

Aptly the digital camera arrangement comprises a processor unit.

Aptly the digital camera arrangement comprises a memory unit.

Aptly the digital camera arrangement comprises a single-board computer.

Aptly the single-board computer comprises a processor unit and a memory unit.

Aptly the single-board computer is a Raspberry Pi computer and optionally is a Raspberry Pi 3 or a Raspberry Pi 4.

Aptly the single-board computer is a Rock Pi computer and optionally is a Rock Pi 4.

Aptly the digital camera arrangement comprises a Raspberry Pi Compute Module IO Board (CMIO) and a Raspberry Pi Compute Module and optionally is a Raspberry Pi Compute Module IO Board V3 and a Raspberry Pi Compute Module 3.

Aptly the digital camera arrangement comprises a part of a handheld device.

Aptly the digital camera arrangement is mounted to an unmanned aerial vehicle (UAV) and optionally is an unmanned quadcopter or a drone.

Aptly the digital camera arrangement is mounted to a manned aerial vehicle and optionally is an aeroplane or a helicopter.

Aptly the digital camera arrangement is mounted to a piece of agricultural equipment and optionally is a tractor or a harvester.

According to a second aspect of the present invention there is apparatus for determining a reflectance, of at least a portion of a target object, in at least one selected wavelength range of electromagnetic (EM) radiation, comprising:

at least one digital camera arrangement that each provide respective output image data that comprises digital numbers that are responsive to radiation, in only a selected wavelength range, incident at a sensing plane of the digital camera arrangement; and a processor unit configured to process the respective output image data.

Aptly the apparatus further comprises a memory unit for storing and selectively providing:

the respective output image data, provided by each digital camera arrangement, to the processor unit; and data output by the processor unit.

Aptly the apparatus further comprises a plurality of reference objects each having respective non-identical predetermined reflectance characteristics.

Aptly a predetermined reflectance characteristic of a reference object is a reflectance, for a selected wavelength range, of the reference object.

Aptly the output image data further comprises file format overhead.

Aptly the output image data comprises gamma-encoded data.

Aptly the target object is a plant, a crop, a field, a forest, a portion of agricultural land, a garden, or a leaf or set of leaves thereof.

Aptly a selected wavelength range of electromagnetic (EM) radiation is selected from a wavelength range of visible red light.

Aptly a selected wavelength range of electromagnetic (EM) radiation is selected from a wavelength range of near-infrared (NIR) light.

Aptly a selected wavelength range of electromagnetic (EM) radiation is 610 nm to 630 nm.

Aptly a selected wavelength range of electromagnetic (EM) radiation is 710 nm to 730 nm.

Aptly a mid-range wavelength of a selected wavelength range of electromagnetic (EM) radiation is between 665 nm and 675 nm and optionally is 668 nm.

Aptly a mid-range wavelength of a selected wavelength range of electromagnetic (EM) radiation is between 710 nm and 720 nm and optionally is 717 nm.

Aptly the digital camera arrangement comprises at least one digital camera.

Aptly the at least one digital camera comprises a Raspberry Pi Camera Module and optionally is a Raspberry Pi Camera Module V2.

Aptly the at least one digital camera comprises a Raspberry Pi NoIR Camera Module and optionally is a Raspberry Pi Camera Module NoIR V2.

Aptly the digital camera arrangement comprises a plurality of electromagnetic radiation filters.

Aptly at least one of the plurality of electromagnetic radiation filters comprise a blue optical filter.

Aptly at least one of the plurality of electromagnetic radiation filters comprise a near infrared (NIR) light filter.

Aptly the at least one digital camera comprises at least one electromagnetic radiation filter of the plurality of electromagnetic radiation filters.

Aptly the digital camera arrangement comprises the processor unit.

Aptly the digital camera arrangement comprises the memory unit.

Aptly the digital camera arrangement comprises a single-board computer.

Aptly the single-board computer comprises a processor unit and a memory unit.

Aptly the single-board computer is a Raspberry Pi computer and optionally is a Raspberry Pi 3 or a Raspberry Pi 4.

Aptly the single-board computer is a Rock Pi computer and optionally is a Rock Pi 4.

Aptly the digital camera arrangement comprises a Raspberry Pi Compute Module IO Board (CMIO) and a Raspberry Pi Compute Module and optionally is a Raspberry Pi Compute Module IO Board V3 and a Raspberry Pi Compute Module 3.

Aptly the digital camera arrangement comprises a part of a handheld device.

Aptly the digital camera arrangement is mounted to an unmanned aerial vehicle (UAV) and optionally is an unmanned quadcopter or a drone.

Aptly the digital camera arrangement is mounted to a manned aerial vehicle and optionally is an aeroplane or a helicopter.

Aptly the digital camera arrangement is mounted to a piece of agricultural equipment and optionally is a tractor or a harvester.

Certain embodiments of the present invention provide a method and apparatus for determining the reflectance, of at least a portion of a target object, in a selected wavelength range at an accuracy equivalent to that available via certain existing solutions, but at a lower cost.

Certain embodiments of the present invention provide a method and apparatus for determining at least one index of reflectance, of at least a portion of a target object, at an accuracy equivalent to that available via certain existing solutions, but at a lower cost.

Certain embodiments of the present invention provide a method and apparatus for determining the reflectance, of at least a portion of a target object, in a selected wavelength range by using widely available and/or cheaper components, for example cheaper optical filters, lenses, and sensors than is possible with known techniques.

Certain embodiments of the present invention provide a method and apparatus for determining at least one index of reflectance, of at least a portion of a target object, in a selected wavelength range by using widely available and/or cheaper components, for example cheaper optical filters, lenses, and sensors than is possible with known techniques.

Certain embodiments of the present invention provide a method and apparatus for calibrating image data, comprising gamma-encoded data, output by a sensor against objects of known reflectance.

Certain embodiments of the present invention will now be described hereinafter, by way of example only, with reference to the accompanying drawings in which.

Figure 13A:
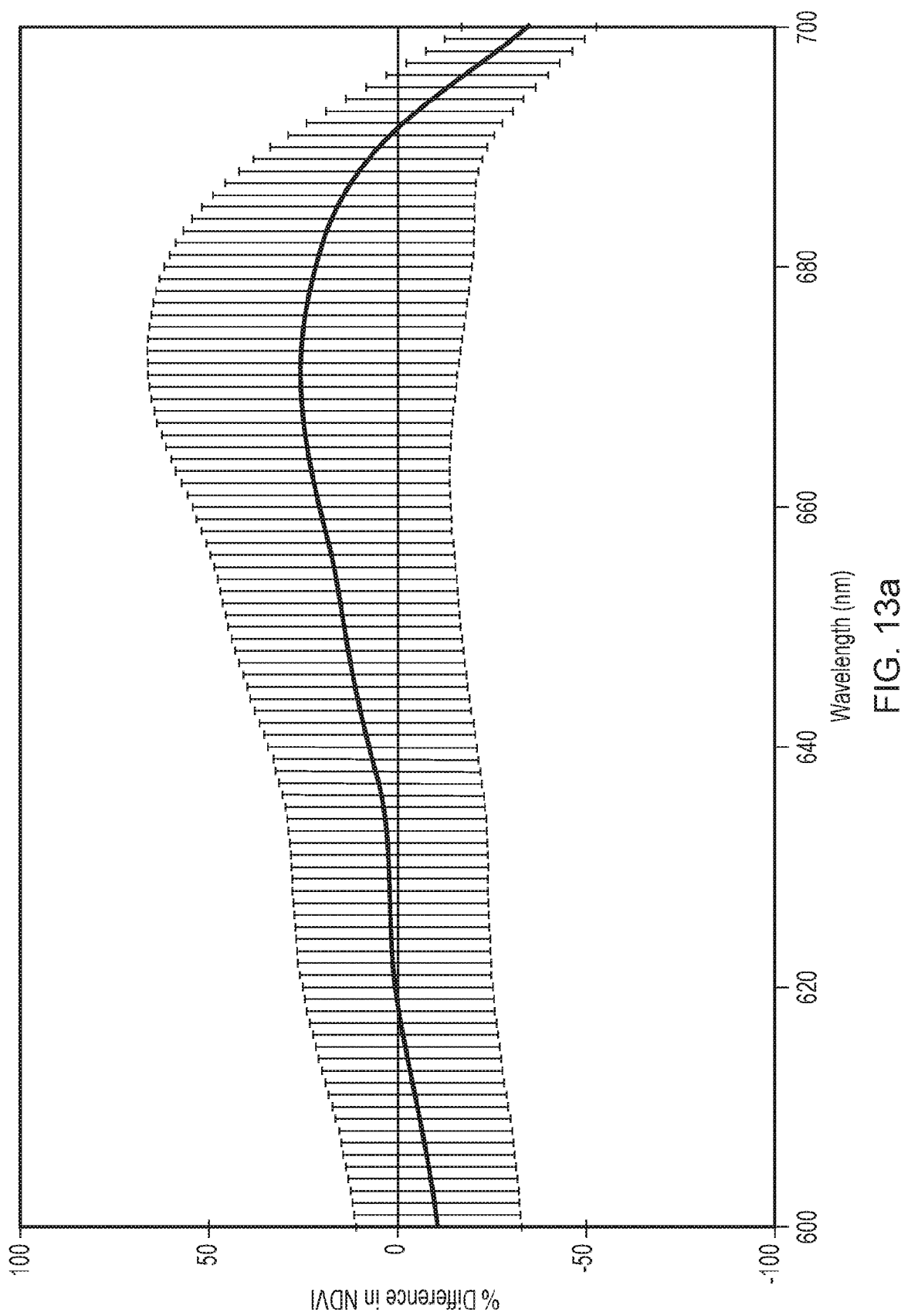
Figure 13B:
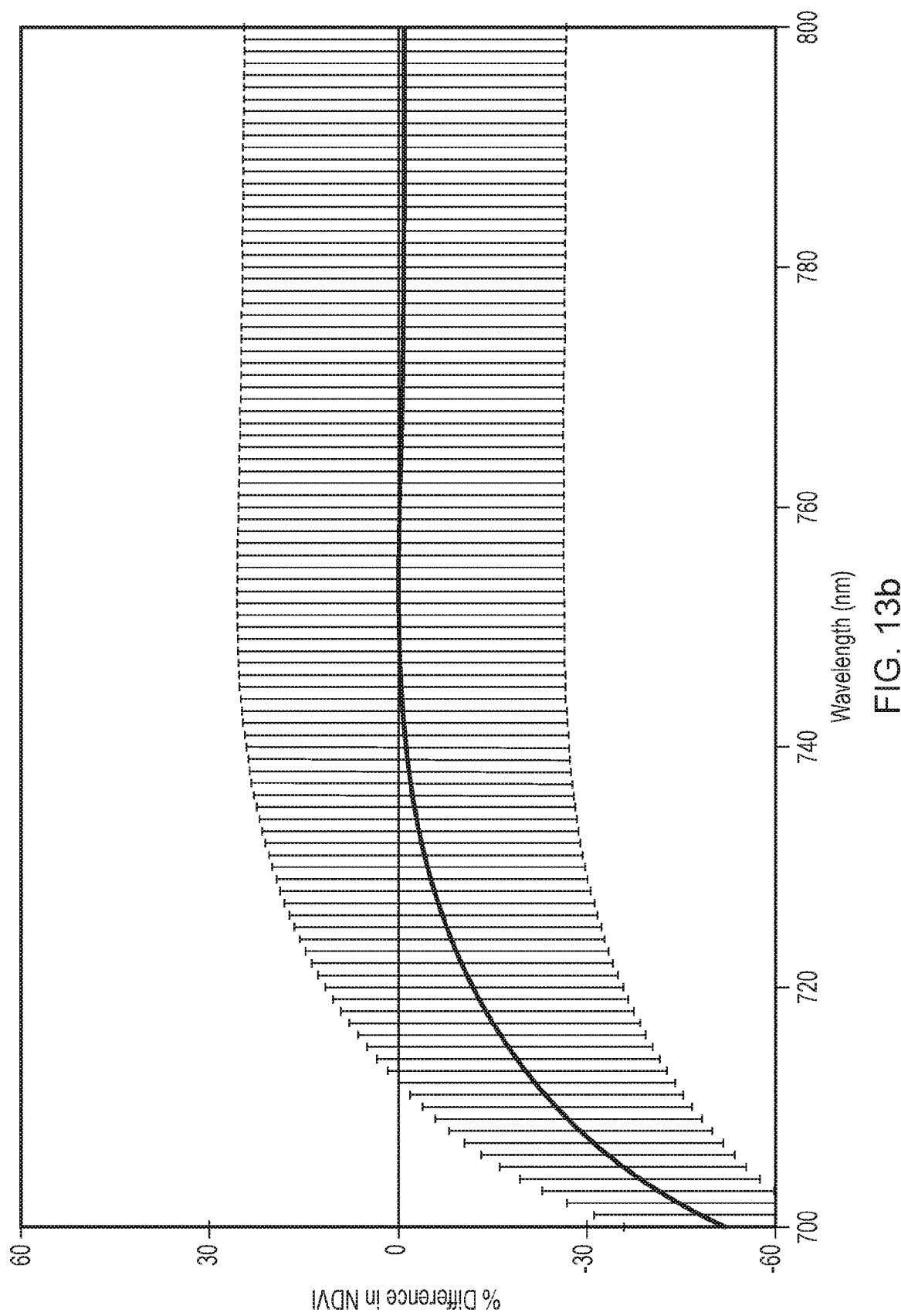

FIG. 13a illustrates the percentage difference, at specific wavelengths (within the 600-700 nm range), between an NDVI of a plant determined using an embodiment of the present invention and an NDVI of the same plant determined using a spectrometer; and FIG. 13b illustrates the percentage difference, at specific wavelengths (within the 700-800 nm range), between an NDVI of a plant determined using an embodiment of the present invention and an NDVI of the same plant determined using a spectrometer.

In the drawings like reference numerals refer to like parts.

Figure 1:
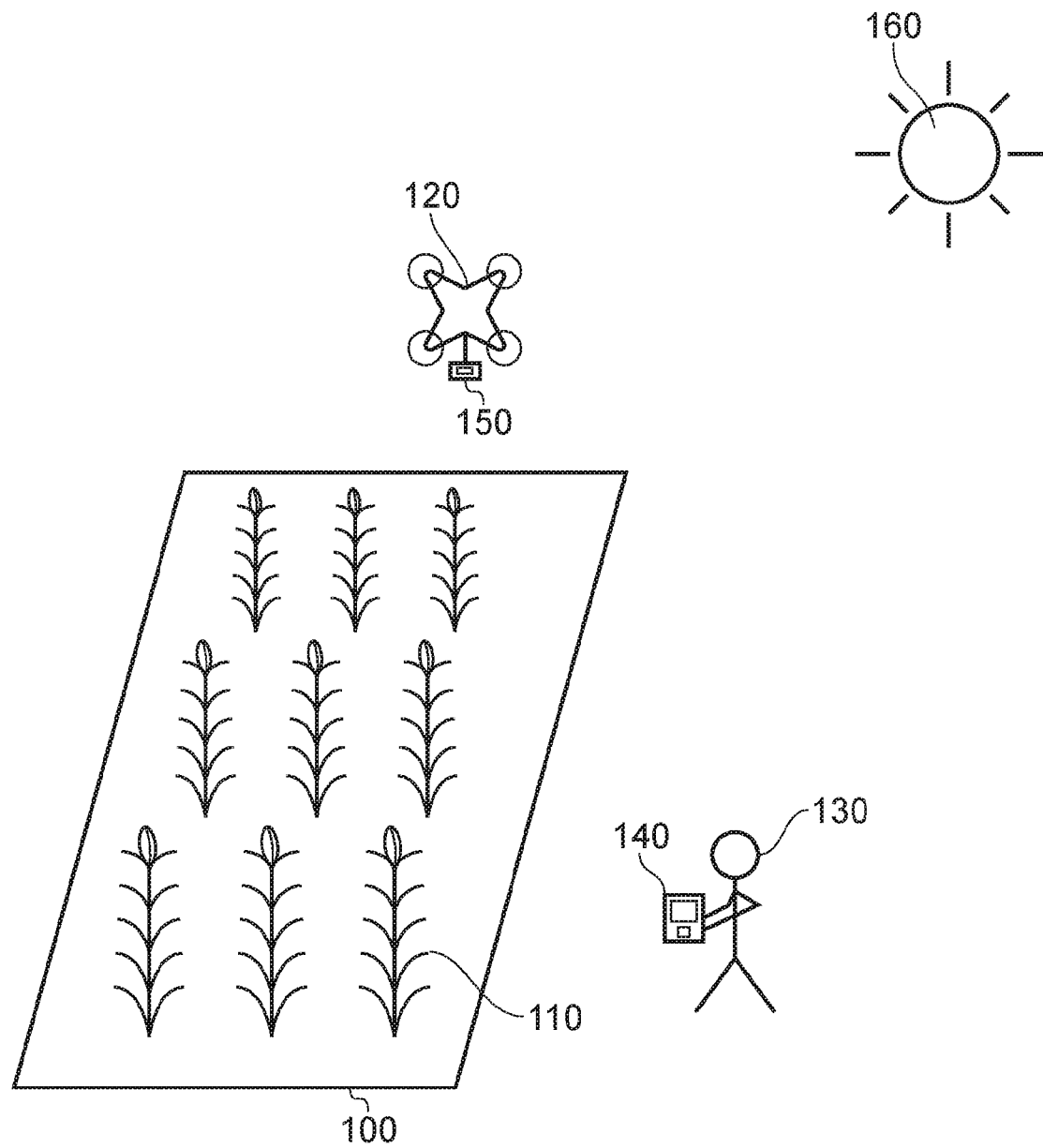
FIG. 1 illustrates a scene including a target object.

FIG. 1 illustrates a field 100 containing crops 110 which are of interest to a user 130. The user 130 holds a handheld device 140 comprising a digital camera arrangement which captures electromagnetic radiation reflected by the crops 110. Alternatively, an unmanned quadcopter 120 observes the field 100 from above. A quadcopter-mounted setup 150 comprises a digital camera arrangement and captures electromagnetic radiation reflected by the crops 110. The crops 110 are irradiated by the Sun 160.

It is noted that other than a field containing crops, there are many other examples of environments containing plants that could be of interest to a user. For example, woodlands, natural reserves, gardens, and the like. Naturally, these different examples may also contain a wide variety of different plants or contain a monoculture. These examples are examples of 'target objects'. Target objects are objects of which the reflectance, within a selected wavelength range, of at least a portion of the target object, is to be measured. An index of reflectance of a target object might also be determined.

It will be understood that a target object may comprise a field, a forest, a natural reserve, a garden, and the like, and a portion of a target object may comprise a plant or a set of plants, leaf or set of leaves, or another feature thereof. Similarly, it will also be understood that a target object may comprise a plant or set of plants, and a portion of a target object may comprise a leaf or set of leaves, or another feature thereof.

Still furthermore, it will be appreciated that according to certain embodiments of the present invention, the target object may be an inanimate object such as a vehicle, a painted surface of a structure, a rock surface, or the like. The target object can be man-made and/or natural.

A user might be an academic, farmer, agricultural analyst, gardener, and the like. Other setups that capture electromagnetic radiation are possible and include setups that are mountable to other unmanned aerial vehicles, such as unmanned fixed-wing aircraft or unmanned helicopters. Likewise, manned variants of these aerial vehicles could also suffice. Furthermore, such a setup could be mounted land vehicles, for example agricultural equipment, such as tractors and harvesters, automobiles, and the like. Wherever and however mounted, each system comprises a digital camera arrangement.

Circumstantially, the plants or crops of interest could be irradiated by means other than exposure to sunlight i.e. artificially. One example when this might be the case is for plants grown indoors, for example in a house, greenhouse, or an indoor farm.

Figure 2:
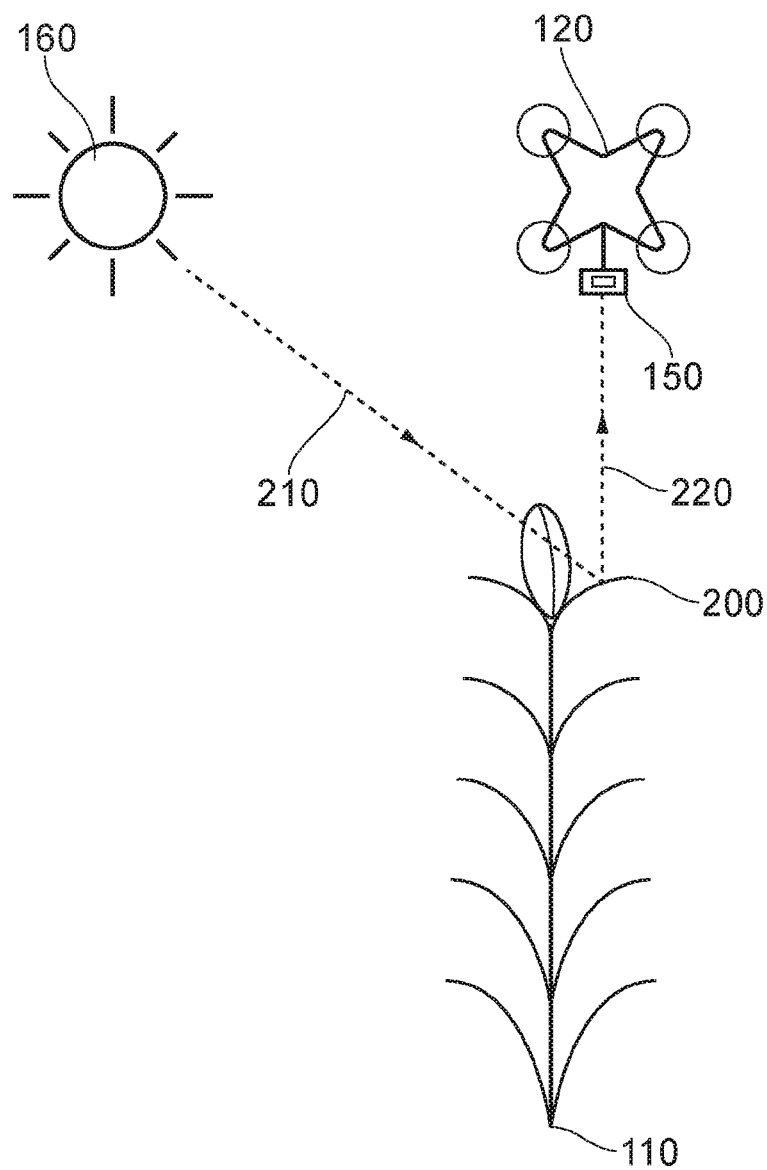
FIG. 2 illustrates a portion of a target object.

FIG. 2 illustrates the surface of a leaf 200 of a crop 110 that is irradiated by the Sun 160. A ray of incident solar radiation 210 reflects off the surface of the leaf 200 (for example) and the reflected solar radiation 220 is captured by the quadcopter-mounted setup 150. As explained with respect to FIG. 1, other sources of electromagnetic radiation might be present, and the radiation might be captured by a handheld device or an alternatively mounted setup. In this example the target object is the crop 110 and the leaf 200 is a portion of the target object. As explained with respect to FIG. 1, other combinations of target objects and portions thereof are possible.

Figure 3:
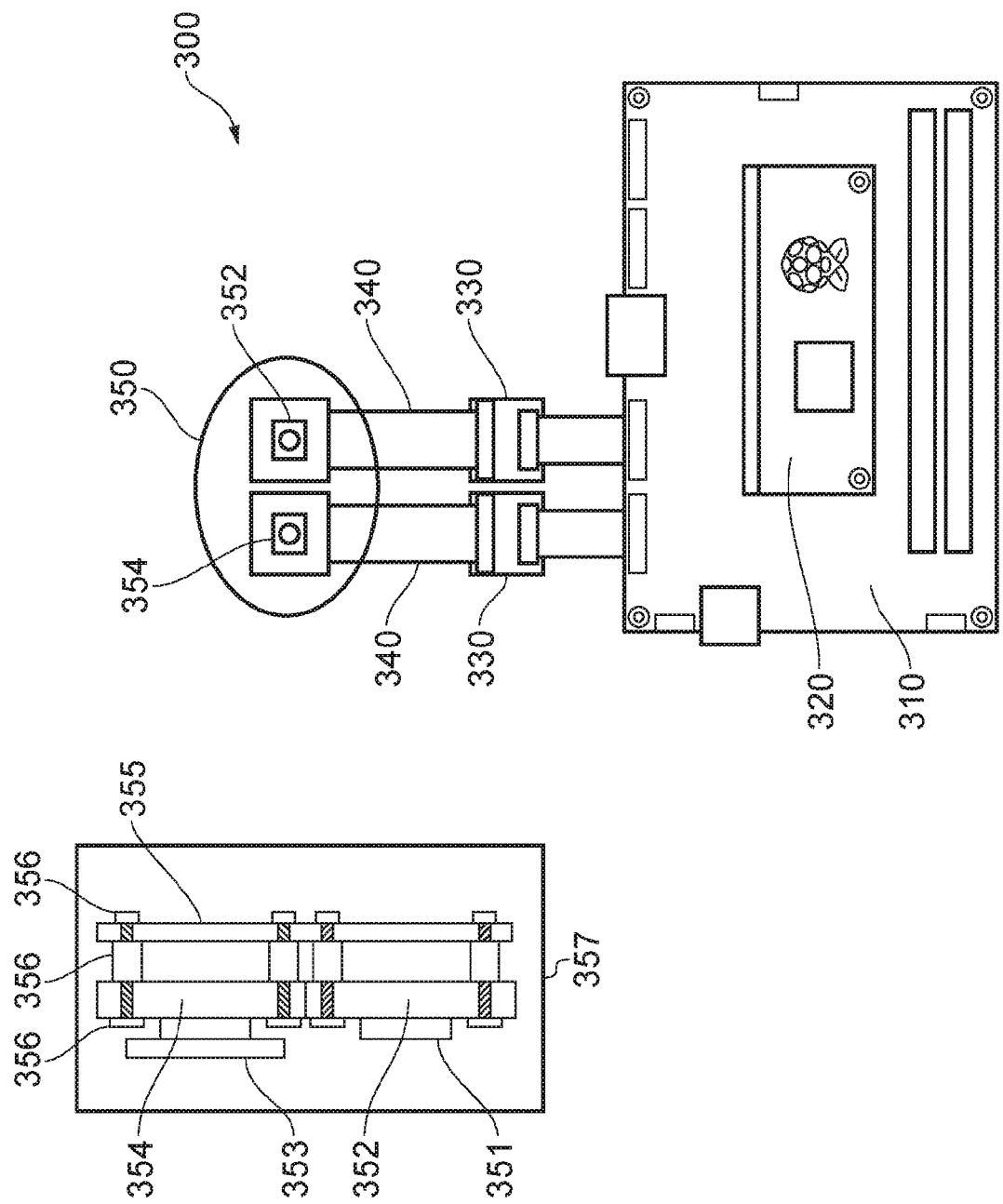
FIG. 3 illustrates a digital camera arrangement.

FIG. 3 illustrates an example digital camera arrangement 300 comprising a dual digital camera setup 350 connected via ribbon cables 340 and adapters 330 to a Raspberry Pi Compute Module IO Board V3 310, which is in turn connected to a Raspberry Pi Compute Module 3 320. The dual digital camera setup 350 comprises a Raspberry Pi Camera Module V2 352 and a Raspberry Pi Camera Module NoIR V2 354. The dual digital camera setup 350 is further shown in a profile view 357. NoIR means 'No Infrared filter' i.e. the infrared filter that is usually included with a digital camera to output ordinary RGB image data (such as Raspberry Pi Camera Module V2 352) has been removed, so NIR radiation will be allowed to 'leak' intentionally into the red channel of the sensor of the Camera Module. A blue optical filter 353 filters light incoming to the Raspberry Pi Camera Module NoIR V2 354. The blue optical filter 353 blocks a large proportion of the incoming red light (see FIG. 8), and thus it can be concluded that the radiation that is incident on the red channel of the sensor of the Raspberry Pi Camera Module NoIR V2 354 is NIR. Therefore. Raspberry Pi Camera Module NoIR V2 354 outputs image data responsive to the NIR radiation incident on the sensor of the Camera Module 354. The dual digital camera setup 350 is mounted to a metal frame 355 via a mount 356 comprising screws and nuts.

It will be appreciated that whilst Raspberry Pi based modules have been described in certain embodiments of the present invention, other computing systems could be used. An example of an alternative computing system is a single-board computer. An example of a single-board computer is a Raspberry Pi 3 or the like.

Figure 4:
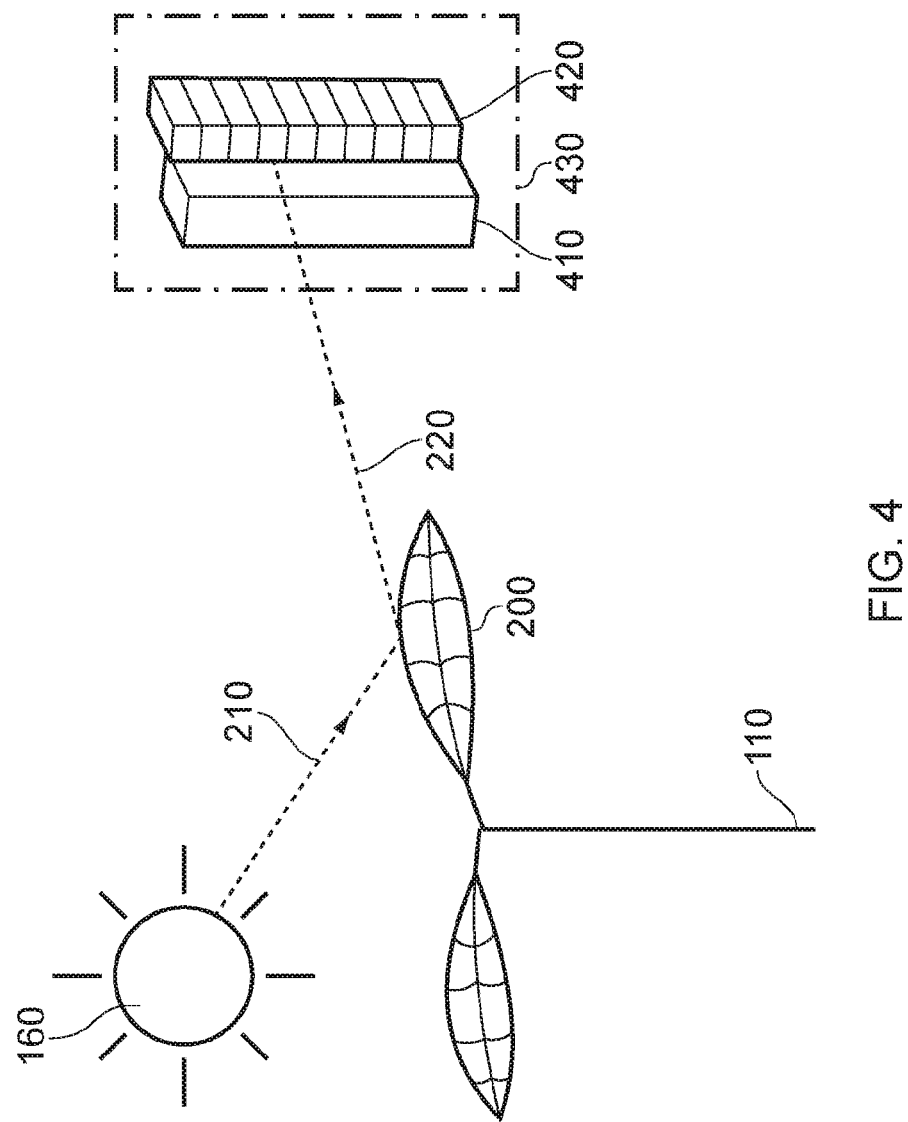
FIG. 4 illustrates radiation reflected from a leaf.

FIG. 4 illustrates incident solar radiation 210 that is reflected off a leaf surface 200. The reflected solar radiation 220 is then filtered through a plurality of electromagnetic radiation filters 410 and is in turn incident on a sensing plane 420. A view 430 shows a simplified view of the internal features of a digital camera that could be used as part of the digital camera arrangement 300, such the two digital cameras of the dual camera setup 350 shown in FIG. 3.

The sensing plane 420 comprises a part of a camera sensor. A camera sensor might also be known as an image sensor, digital sensor, and the like.

In accordance with certain embodiments of the present invention, a wide variety of digital camera arrangements are possible. Different combinations of lenses, filters, and sensors could be used. Depending on a choice of radiation filters, the net filtration effect of a particular combination of filters may vary. The plurality of electromagnetic radiation filters 410 represents any one of the combinations of filters that might be used to filter radiation before the radiation is incident on the sensing plane 420 of a particular camera, such that substantially, at most one selected wavelength range of radiation is incident on a corresponding colour channel of the sensing plane 420 of a particular camera. For example, a blue optical filter 353 filtering radiation such that NIR radiation comprises substantially the radiation incident on the red channel of the sensing plane 420 of the digital camera 354. It is not necessary that a selected wavelength range of radiation fall on each colour channel of the sensing plane 420 of a digital camera, although this may be possible and could be utilised, in accordance with certain embodiments of the present invention, to determine the reflectance, of at least a portion of a target object, for each selected wavelength range.

To determine an NDVI, of at least a portion of a target object, utilising the dual camera setup 350 the plurality of radiation filters 410 of the Camera Module 352 filter incoming radiation such that the radiation incident on the sensing plane 420 of the Camera Module 352 comprises substantially red light and for the plurality of radiation filters 410 of the Camera Module 354 to filter incoming radiation such that the radiation incident on the sensing plane 420 of Camera Module 354 comprises substantially NIR light.

Figure 5:
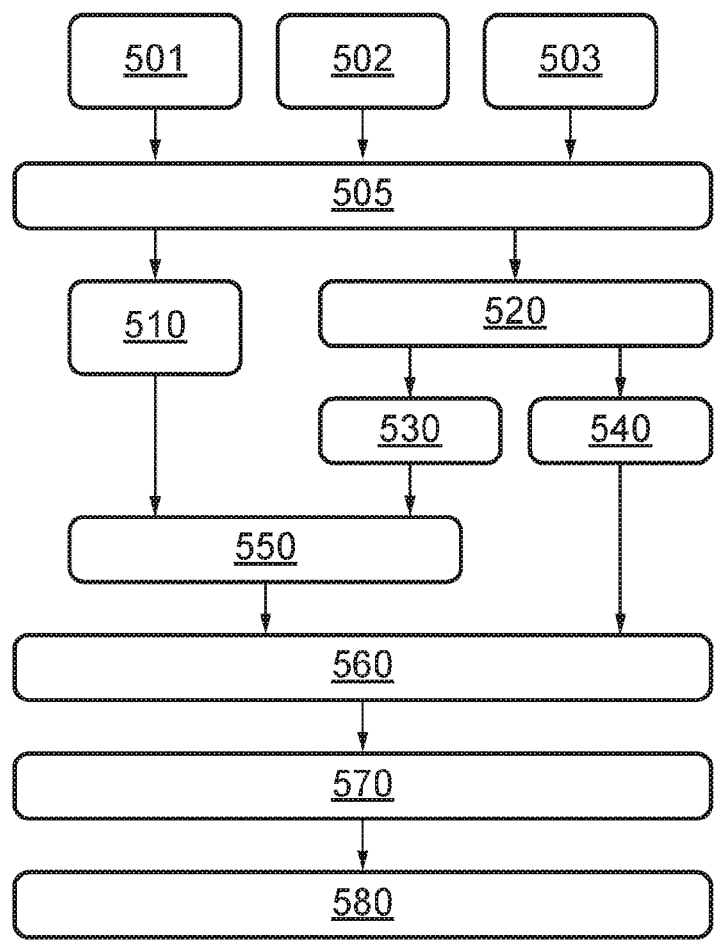
FIG. 5 illustrates steps for determining a reflectance.

FIG. 5 illustrates a flow chart showing certain steps for determining a reflectance, of at least a portion of target object, in a selected wavelength range. As illustrated via a step 501, at least a portion of a target object is decided for which a reflectance, in a selected wavelength range, is to be determined. Also, via step 502, the wavelength range is selected. Via step 503, a digital camera arrangement with a plurality of filters is selected which is appropriate for the selected wavelength range.

A scene is photographed via step 505, using an appropriate digital camera arrangement producing output image data 520, wherein the scene contains the at least a portion of the target object and at least two reference objects of predetermined reflectance. A first set of digital numbers is established, via step 530, from the output image data 520, wherein the first set of digital numbers coincides with the digital numbers corresponding to the reference objects.

Figure 11A:
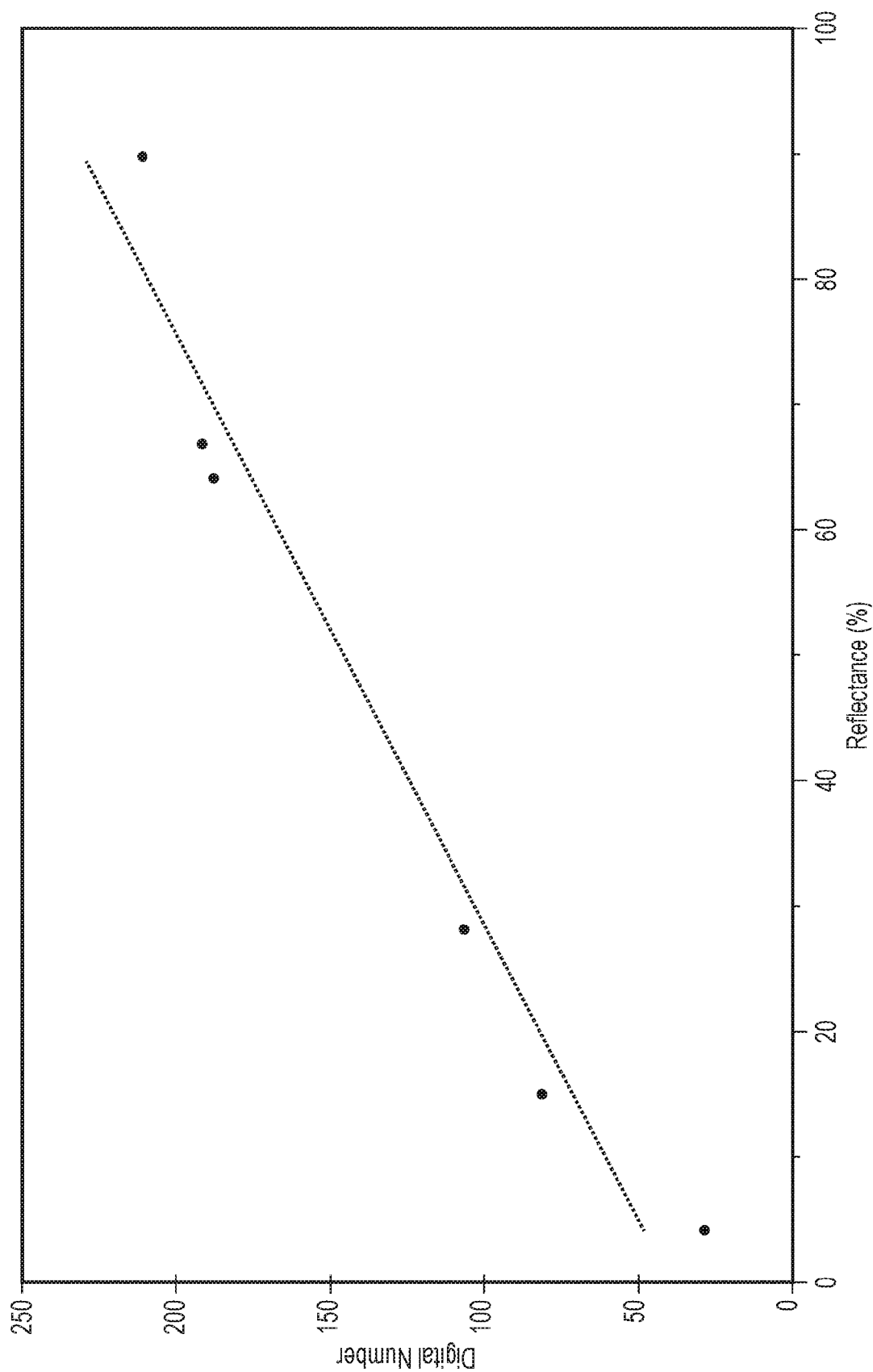
FIG. 11a illustrates a relationship between the digital numbers, corresponding to six reference objects, of the output image data of a digital camera arrangement and the respective reflectance of the six reference objects within the visible red wavelength range of EM radiation.

A relationship is determined via step 550 between the predetermined reflectances 510 of the reference objects and the first set of digital numbers. This relationship may be non-linear, for example if the output image data is gamma-encoded/gamma-corrected. An example of this relationship is shown in FIG. 11*a*.

A further set of digital numbers is established, via step 540, from the output image data 520 wherein the further set of digital numbers coincides with the digital numbers corresponding to the remainder of the photographed scene, i.e. the section of the photographed scene excluding the reference objects. Responsive to the relationship, the further set of digital numbers is transformed via step 560, and a value of reflectance is allocated to each digital number. Via step 570, a group of values of reflectance are allocated to the digital numbers corresponding to the at least a portion of a target object. Responsive to the group, the reflectance of the portion of the target object for the selected wavelength range is determined via step 580.

It will be understood that a digital number may also be referred to as a pixel value.

Figure 6:
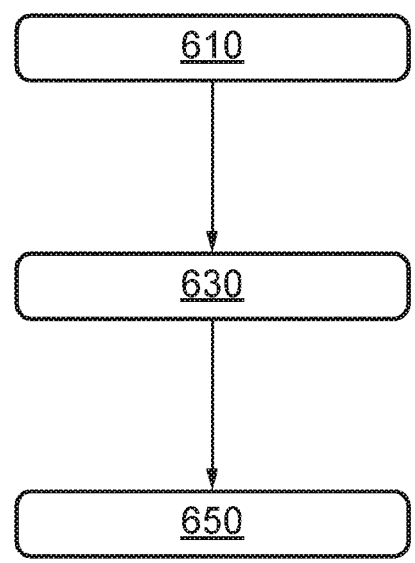
FIG. 6 illustrates steps for determining an index of reflectance of a target object.

FIG. 6 illustrates a flow chart showing the steps for determining an index of reflectance of a target object. The index may be, for example, a 'Normalised Difference Vegetation Index' (NDVI). The formula used to calculate an NDVI is shown by equation 1.1. 'NIR' refers to near infrared radiation and 'RED' refers to red light. The subscript 'refl' means 'reflectance of the object [in the associated wavelength range of radiation]'.

$$NDVI = \frac{(NIR_{refl} - RED_{refl})}{(NIR_{refl} + RED_{refl})} \quad (1.1)$$

Dependent on the index chosen, there may be no standardised definition of what exact wavelength ranges are used to determine the relevant reflectances. That is to say, generally, the wavelength interval of red light may be considered to be 600-700 nm; however, it is not necessary that this wavelength range corresponds exactly to the wavelength range selected to determine the red light reflectance of the object.

Certain embodiments of the present invention were used to determine an NDVI of target objects selecting a wavelength range centred around 750 nm for measuring near infrared light reflectance and a wavelength range centred around 620 nm for measuring red light reflectance. Equation 1.2 shows the equation for calculating an NDVI resulting from these choices.

$$NDVI = \frac{(750_{refl} - 620_{refl})}{(750_{refl} + 620_{refl})} \quad (1.2)$$

Via step 610, the relevant wavelength ranges are selected. Via step 620, the reflectances for the selected wavelength ranges are determined via the methodology illustrated in FIG. 5. Via step 630, the index of reflectance is determined.

Figure 7:
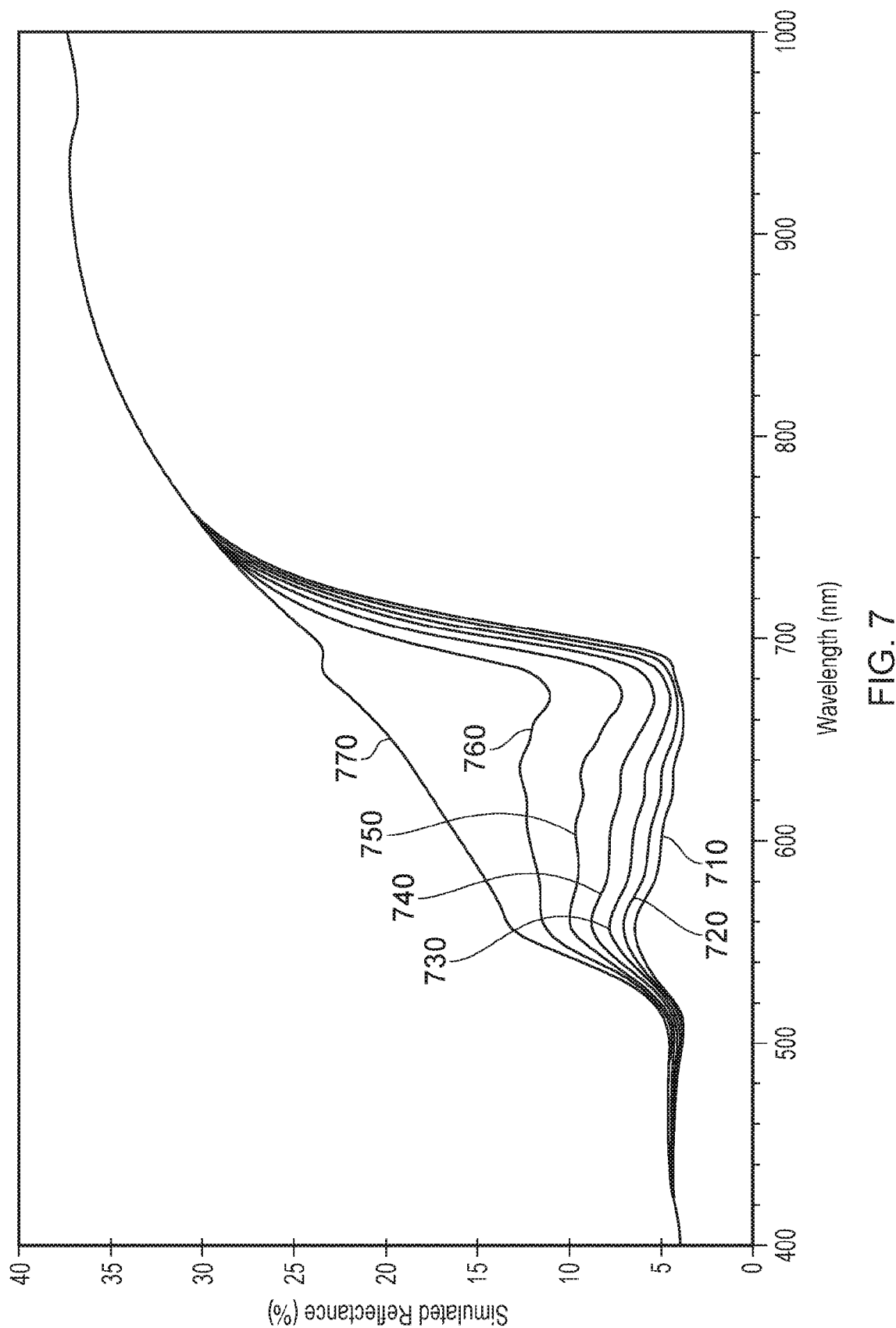
FIG. 7 illustrates multiple simulated absorption spectra of leaves of different surface area densities of chlorophyll for EM radiation within the 400-1000 nm wavelength range.

FIG. 7 illustrates seven plots of spectral reflectance across the 400-1000 nm range of wavelengths. Each plot is simulated from a database of optical leaf properties, such as "Opticleaf", and is distinguished by the difference in area density of chlorophyll of the leaf. It will be understood that other databases could be used. The chlorophyll content increases linearly from the plot 710 (0 µg/cm$^2$) through the plot 770 (30 µg/cm$^2$). It is noted that all seven plots converge as the wavelength approaches 400 nm (violet light) and 750 nm (NIR), but each are divergent between approximately 540 nm and 700 nm (green and red light).

Figure 8:
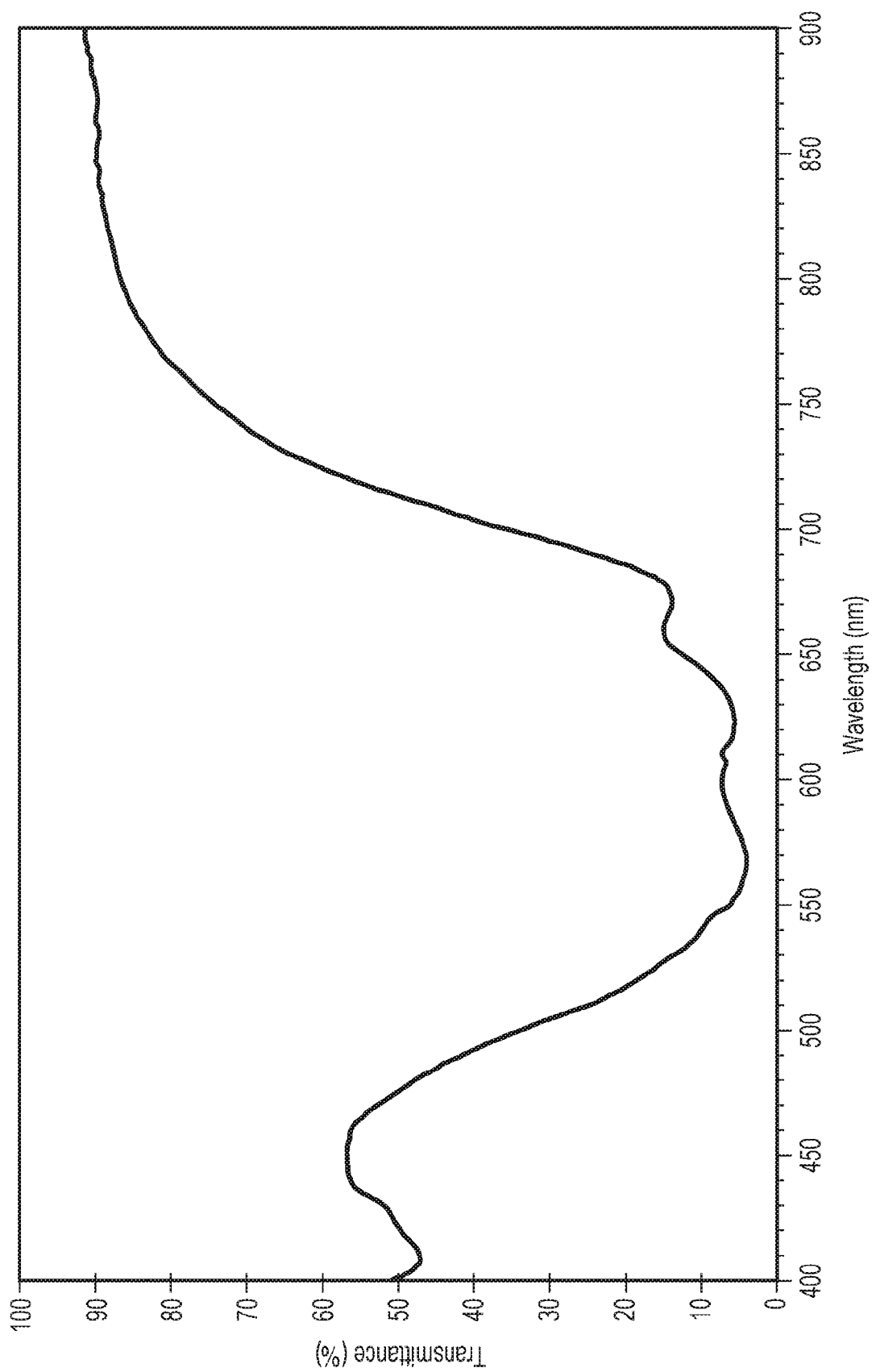
FIG. 8 illustrates the transmittance of a blue optical filter for EM radiation within the 400-900 nm wavelength range.

FIG. 8 illustrates the spectral reflectance across the 400-900 nm range of wavelengths of a blue filter. Strong transmission occurs in the blue regions (from 400 nm to 500 nm), and weak (<15%) transmission in the red regions. The filter allows NIR to transmit through the filter without much loss (>80% transmittance). Therefore, if a blue filter of these reflectance properties is placed before a digital camera such as a Raspberry Pi Camera Module V2 or the like, then most of the light captured on the red channel is NIR.

Figure 9A:
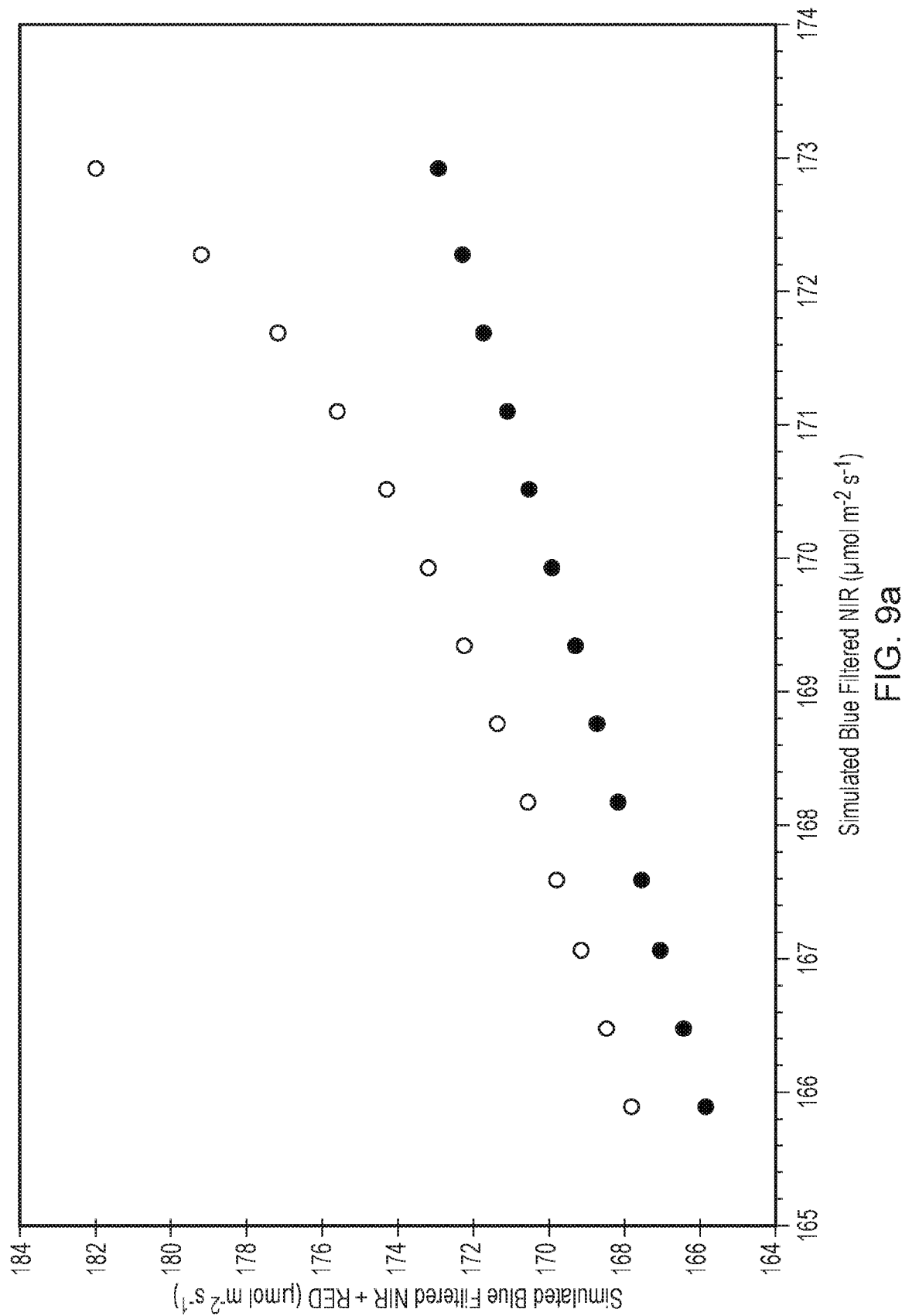
FIG. 9a illustrates simulated filtered light level measurements for light after filtration via a blue optical filter.

FIG. 9*a* illustrates simulated light levels detected by a camera from an 800 µmol m$^{-2}$ s$^{-1}$ light source reflected from modelled leaf surfaces of varying chlorophyll content and measured after transmission through the blue filter of FIG. 8. The measured NIR light, with added red light to compensate for the 5%-15% transmission of red light through the blue filter, is compared to the Photosynthetic Photon Flux Density (PPFD) measured with a simulated camera lens that only receives NIR light—notably, without the transmission of red light. The solid black dots represent the PPFD of measured NIR, if red light leaking onto the red channel was zero (1:1 relationship for NIR). The circles represent the PPFD of both NIR and additional red light, as transmitted through the filter. The difference between the two measurements is the amount of visible red light that is transmitted through the filter and is therefore measured as additional NIR light by the sensor, which was calculated as 0.92955%.

Figure 9B:
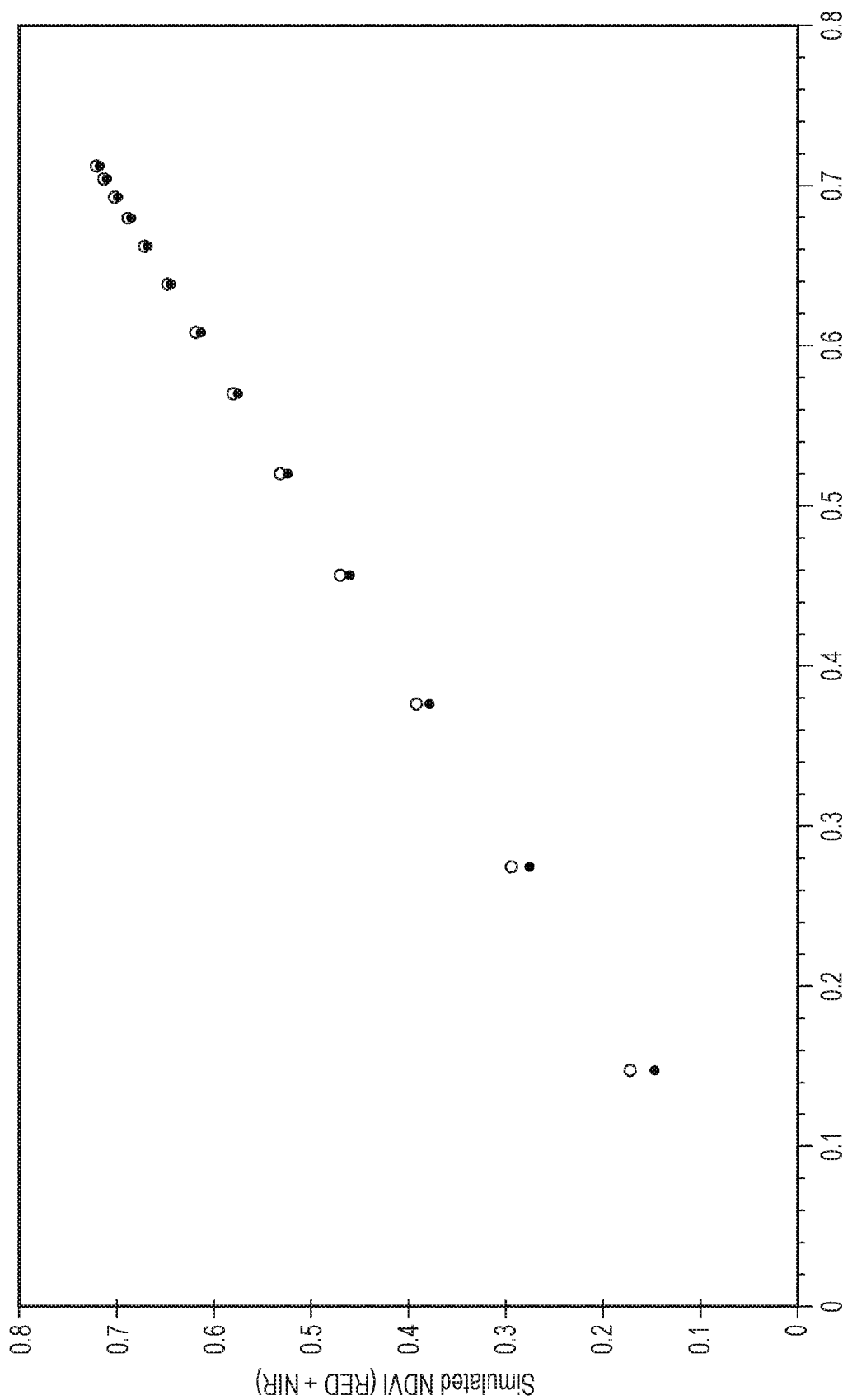
FIG. 9b illustrates simulated NDVIs determined from a simulated light level dataset.

FIG. 9b illustrates a simulated NDVI calculated from the same dataset, showing the NDVI for an NoIR digital camera with no red light transmitted by the blue filter, and an NDVI with some red light transmission. The increase in red light on the red channel of the NoIR digital camera is seen here by the overestimation of NDVI at low values.

Figure 10:
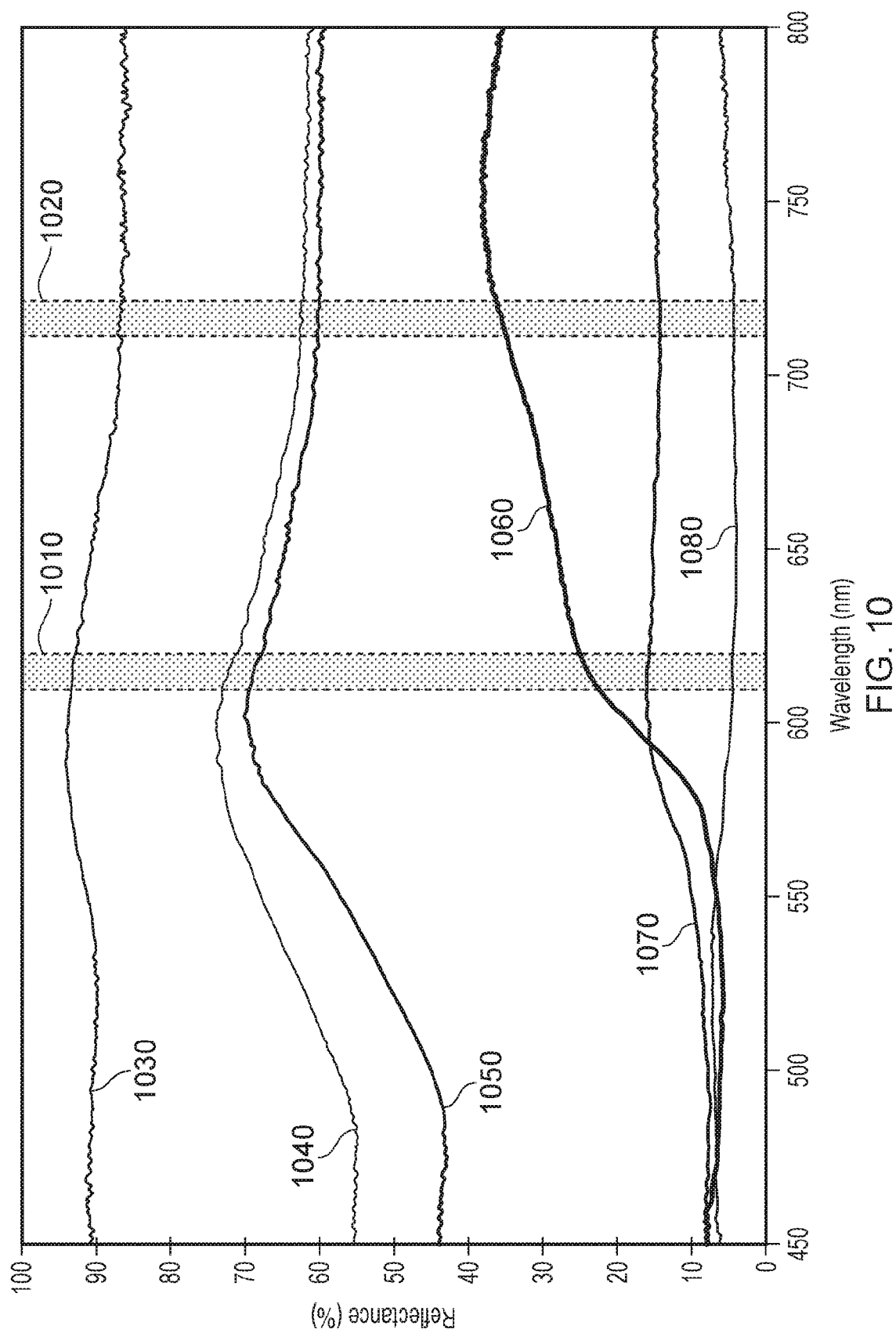
FIG. 10 illustrates the reflectance spectra of six reference objects for EM radiation within the 450-800 nm wavelength range.

FIG. 10 illustrates the reflectance of six objects used as reference objects for calibrating the images captured by the cameras across the 450-800 nm range. The red light wavelength range 1010 and the NIR wavelength range 1020 were selected for use in the NDVI calculation. The reference objects used were materials of predetermined reflectance. The reference objects were materials used as standards of reflectance. The materials exhibit substantially uniform reflectance properties. It might be helpful if the materials were robust, such that they could withstand repeated use, especially outdoors.

It will be understood that the terms reference standard, reference material, reference object, and reflectance standard may be used interchangeably.

FIG. 11a shows a pre-transformation relationship between the digital numbers (of the red channel) corresponding to the six reference objects and reflectance for the six reference objects in the red channel. The relationship shown is non-linear.

Figure 11B:
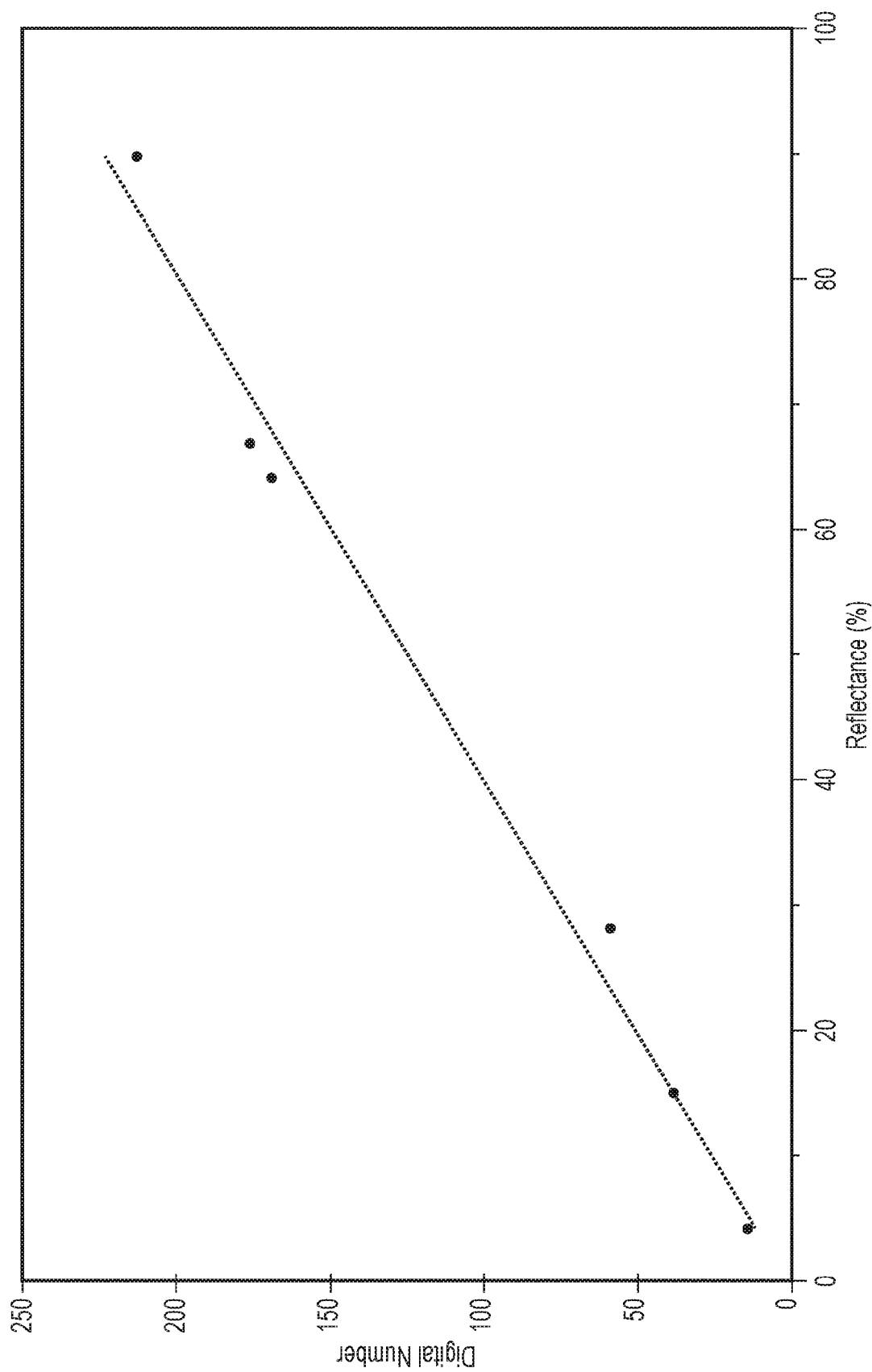
FIG. 11b illustrates a transformed relationship between the digital numbers, corresponding to six reference objects, of the output image data of a digital camera arrangement and the respective reflectance of the six reference objects within the visible red wavelength range of EM radiation.

FIG. 11b shows a post-transformation relationship between the digital numbers (of the red channel) corresponding to the six reference objects and reflectance for the six reference objects in the red channel. The image data has been transformed such that the digital numbers now exhibit linear relationship with reflectance. This relationship is extrapolated for the digital numbers corresponding to the rest of the digital image. A value of reflectance for each of the remaining digital numbers can now be determined.

The digital number is the pixel value (from 0 to 255 for an 8-bit colour-depth sensor) that a camera assigns to each pixel within a colour channel of the image, which in FIGS. 11a and 11b is the red channel, although of course other colour channels could be used. By correlating the known relative reflectance of the reference objects present within the image with the digital pixel numbers from the camera, the resulting correlation can be used to calibrate all digital number values in an image to a relative reflectance. This results in the effective removal of the gamma-correction of the image. It will be understood that a gamma-corrected image is also known as a gamma-encoded image. Similarly, gamma corrected image data is also known as gamma-encoded image data. In this example the image is an RGB image, although other colour models could be used.

Figure 12A:
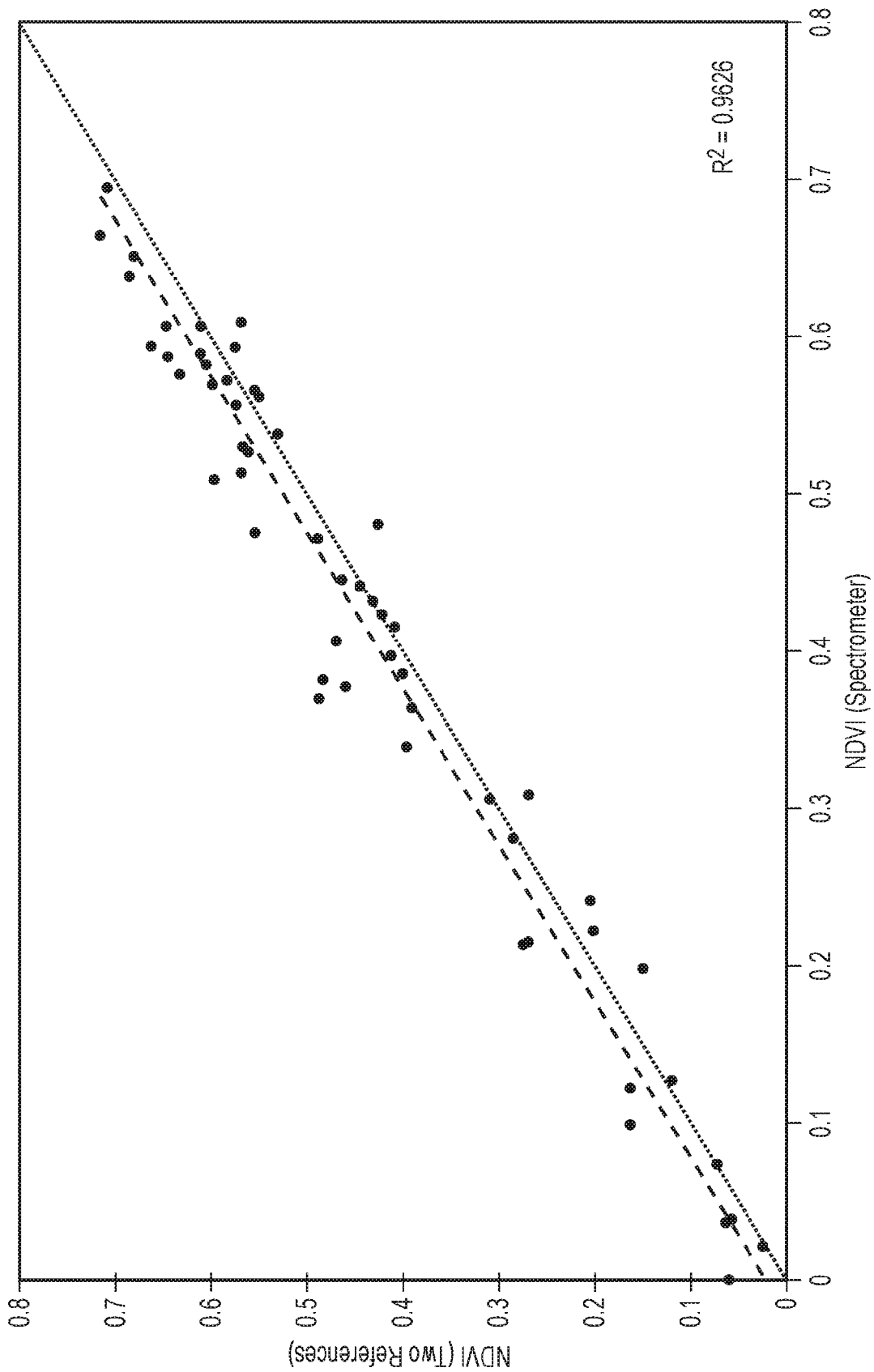
FIG. 12a illustrates a relationship between an NDVI of two different plants, determined using an embodiment of the present invention with two reference objects, and an NDVI of the same plants determined using a spectrometer.

FIG. 12a shows a correlation plot and an associated trendline (shown as a thick dashed line) between the NDVI calculated from images calibrated using two reference objects (specifically the objects with spectral profiles 1030 and 1080 of FIG. 8) and the NDVI measured using a spectrometer (a sophisticated, reliable piece of laboratory equipment). The $R^2$ coefficient of this relationship is: $R^2=0.9626$. FIG. 12a also features a thinner dashed line showing a 1:1 relationship to be used as a visual comparative reference.

Figure 12B:
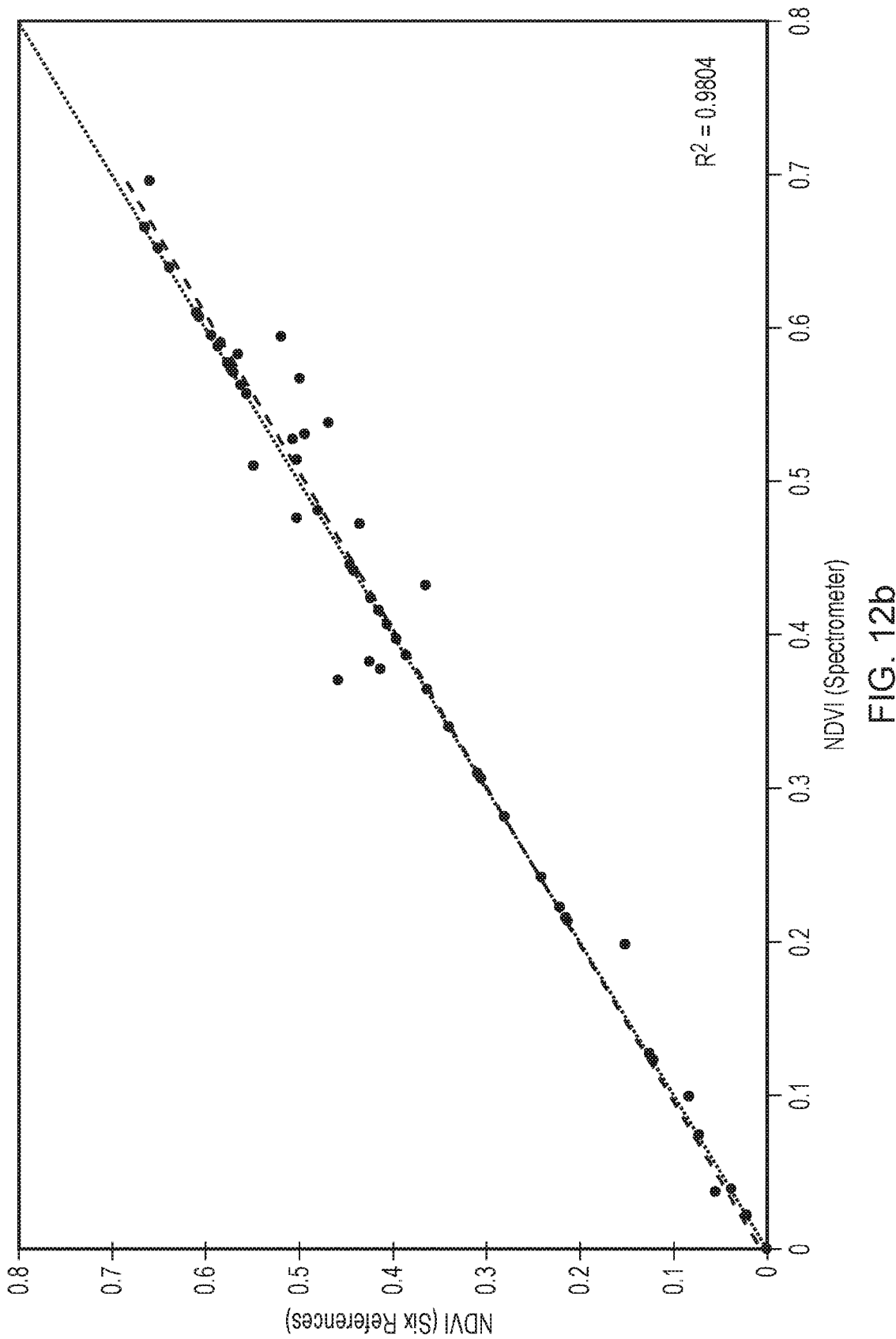
FIG. 12b illustrates a relationship between an NDVI of two different plants, determined using an embodiment of the present invention with six reference objects, and an NDVI of the same plants determined using a spectrometer.

FIG. 12b shows a correlation plot and an associated trendline (shown as a thick dashed line) between the NDVI calculated from images calibrated using the six reference objects of FIG. 10 and the NDVI measured using the spectrometer. The $R^2$ coefficient of this relationship is: $R^2=0.9804$. It can be seen that despite using fewer reference objects to calibrate and remove the gamma correction, the determined NDVI still remains highly correlated with the laboratory values measured using the spectrometer. FIG. 12b also features a thinner dashed line showing a 1:1 relationship to be used as a comparative visual reference.

FIGS. 13a and 13b show the percentage difference, with error bars, in NDVI between the spectrometry derived values and the values determined using the method and apparatus as described in certain embodiments of the present invention. FIG. 13a shows this percentage difference for spectrometry derived values determined using a fixed NIR wavelength of 750 nm and a visible red light wavelength that varies over the 600-700 nm range. FIG. 13b shows this percentage difference for spectrometry derived values determined using a fixed visible red light wavelength of 620 nm and a NIR wavelength that varies over the 700-800 nm range.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for determining a reflectance, of at least a portion of a target object, in at least one selected wavelength range of electromagnetic (EM) radiation, comprising, for each selected wavelength range:
   providing a digital image including at least one target object and a plurality of reference objects, each reference object having respective non-identical predetermined reflectance characteristics, with a digital camera arrangement that provides output image data that comprises digital numbers that are responsive to radiation, in only a selected wavelength range, incident at a sensing plane of the digital camera arrangement, wherein the digital image is a digital representation of a scene including the at least one target object and the plurality of reference objects and wherein the output image data comprises gamma encoded data;
   determining a pre-transformation relationship between a first set of the digital numbers and a first set of the respective predetermined reflectance characteristics of the reference objects, wherein the first set of digital numbers coincide with the digital numbers corresponding to the reference objects and wherein the pre-transformation relationship is non-linear;

determining a post-transformation relationship between the first set of the digital numbers and the first set of the respective predetermined reflectance characteristics of the reference objects, wherein the post-transformation relationship is linear;

extrapolating the post-transformation relationship to a further set of digital numbers that coincide with the digital numbers corresponding to a remainder of the scene excluding the reference objects;

responsive to extrapolation of the post-transformation relationship, transforming a further set of digital numbers to allocate a value of reflectance for each of the digital numbers in the further set;

for at least a portion of the target object, determining a corresponding first group of allocated values of reflectance; and responsive to the first group of allocated values, determining a reflectance of the portion of the target object.

2. The method as claimed in claim 1 further comprising: determining an index of reflectance for the portion of the target object.

3. The method as claimed in claim 2 further comprising, determining the index of reflectance by the steps of:
via a first selected wavelength range, determining a corresponding first reflectance of the portion of the target object;
via at least a second selected wavelength range, determining a corresponding further reflectance of the portion of the target object; and
determining the index by determining a predetermined relationship between the first and further reflectances.

4. The method as claimed in claim 2, wherein the index of reflectance is a Normalised Differenced Vegetation Index (NDVI) or a Photochemical Reflectance Index (PRI).

5. The method as claimed in claim 1 further comprising: modifying allocated values of reflectance for each of the digital numbers in the further set, whereby values below 0% reflectance are set to 0% reflectance and values above 100% reflectance are set to 100% reflectance.

6. The method as claimed in claim 1 wherein a predetermined reflectance characteristic of a reference object is a reflectance, for a selected wavelength range, of the reference object.

7. The method as claimed in claim 1 wherein each portion of a target object comprises at least one region of interest.

8. The method as claimed in claim 1 wherein a selected wavelength range of electromagnetic (EM) radiation is selected from a wavelength range of visible red light or from a wavelength range of near-infrared (NIR) light.

9. An apparatus for determining a reflectance, of at least a portion of a target object, in at least one selected wavelength range of electromagnetic (EM) radiation, comprising:
at least one digital camera arrangement, each configured to capture a digital image that is a digital representation of a scene including the at least one target object and a plurality of reference objects, and that each provide respective output image data that comprises digital numbers that are responsive to radiation, in only a selected wavelength range, incident at a sensing plane of the digital camera arrangement, wherein the output image data comprises gamma encoded data; and a processor configured to process the respective output image data by performing the steps of:
determining a pre-transformation relationship between a first set of the digital numbers and a first set of respective predetermined reflectance characteristics of the reference objects, wherein the first set of digital numbers coincide with the digital numbers corresponding to the reference objects and wherein the pre-transformation relationship is non-linear;
determining a post-transformation relationship between the first set of the digital numbers and the first set of the respective predetermined reflectance characteristics of the reference objects, wherein the post-transformation relationship is linear;
extrapolating the post-transformation relationship to a further set of digital numbers that coincide with the digital numbers corresponding to a remainder of the scene excluding the reference objects;
responsive to extrapolation of the post-transformation relationship, transforming the further set of digital numbers to allocate a value of reflectance for each of the digital numbers in the further set;
for at least a portion of the target object, determining a corresponding first group of allocated values of reflectance; and
responsive to the first group of allocated values, determining a reflectance of the portion of the target object.

10. The apparatus as claimed in claim 9 further comprising a memory for storing and selectively providing:
the respective output image data, provided by each digital camera arrangement, to the processor; and
data output by the processor.

11. The apparatus as claimed in claim 9 further comprising:
a plurality of reference objects each having respective non-identical predetermined reflectance characteristics.

12. The apparatus as claimed in claim 9, wherein the digital camera arrangement comprises at least one digital camera and optionally a Raspberry Pi Camera Module, for example a Raspberry Pi Camera Module V2, and/or a Raspberry Pi NoIR Camera Module, for example a Raspberry Pi Camera Module NoIR V2.

13. The apparatus as claimed in claim 9, wherein the digital camera arrangement comprises a plurality of electromagnetic radiation filters.

14. The apparatus as claimed in claim 13 wherein at least one of the plurality of electromagnetic radiation filters comprises a near infrared (NIR) light filter and at least of one of the plurality of electromagnetic radiation filters comprises a blue optical filter.

15. The apparatus as claimed in claim 9 wherein the digital camera arrangement comprises a single-board computer.

16. The apparatus as claimed in claim 15 wherein the single-board computer is a Raspberry Pi computer and optionally is a Raspberry Pi 3 or a Raspberry Pi 4.

17. The apparatus as claimed in claim 9 wherein the digital camera arrangement comprises a part of a handheld device.

18. The apparatus as claimed in claim 9, wherein the digital camera arrangement is mounted to an unmanned aerial vehicle (UAV), optionally an unmanned quadcopter or a drone, or a manned aerial vehicle, optionally an aeroplane or a helicopter, or a piece of agricultural equipment, optionally a tractor or a harvester.

* * * * *